(12) United States Patent
Turck

(10) Patent No.: US 11,091,324 B1
(45) Date of Patent: Aug. 17, 2021

(54) FRICTION CONTROLLED CONTAINER TWISTING DEVICE

(71) Applicant: CHP N.V., Beveren (BE)

(72) Inventor: Pieter Turck, Kapellen (BE)

(73) Assignee: CHP N.V., Beveren (BE)

( * ) Notice: Subject to any disclaimer, the term of this patent is extended or adjusted under 35 U.S.C. 154(b) by 0 days.

(21) Appl. No.: 16/950,520

(22) Filed: Nov. 17, 2020

(30) Foreign Application Priority Data

Jul. 22, 2020 (WO) ................ PCT/IB2020/056897
Sep. 25, 2020 (EP) ..................................... 20020432

(51) Int. Cl.
*B65G 47/244* (2006.01)
*B65G 45/02* (2006.01)

(52) U.S. Cl.
CPC .......... *B65G 47/244* (2013.01); *B65G 45/02* (2013.01); *B65G 2201/0244* (2013.01); *B65G 2201/0252* (2013.01)

(58) Field of Classification Search
CPC ...... B65G 45/02; B65G 47/24; B65G 47/244; B65G 47/248; B65G 47/252; B65G 2201/0244; B65G 2201/0247; B65G 2201/0252; B65G 2201/0255
USPC .......................................... 198/389–390, 500
See application file for complete search history.

(56) References Cited

U.S. PATENT DOCUMENTS

| | | | | |
|---|---|---|---|---|
| 3,797,624 A * | 3/1974 | Powell | .................. | B65G 47/248 193/25 R |
| 3,797,641 A | 3/1974 | Nelson et al. | | |
| 4,458,801 A * | 7/1984 | Nichols | ................ | B65G 11/063 193/46 |
| 5,609,237 A * | 3/1997 | Lenhart | ................ | B65G 47/248 198/406 |
| 6,116,401 A | 9/2000 | Carleton | | |
| 7,617,921 B2 * | 11/2009 | Workman | ............ | B65G 47/248 193/29 |
| 9,809,399 B1 * | 11/2017 | Lindauer | ................ | B65G 51/02 |
| 10,807,806 B1 * | 10/2020 | Womack | .............. | B65G 11/023 |
| 2012/0000746 A1 * | 1/2012 | Seger | ..................... | B65G 21/20 198/500 |
| 2015/0158674 A1 * | 6/2015 | Garner | ............... | B65G 21/2036 198/380 |
| 2019/0047789 A1 * | 2/2019 | Kilgenstein | ......... | B29C 49/4205 |
| 2019/0329921 A1 * | 10/2019 | Thomas | .................... | B65B 3/12 |

FOREIGN PATENT DOCUMENTS

| | | |
|---|---|---|
| CN | 110550420 A | 12/2019 |
| EP | 1637482 A1 | 3/2006 |
| GB | 1296189 | 11/1972 |

OTHER PUBLICATIONS

European Search Report in Priority application EP 20020432.9; filed Jul. 22, 2020.

* cited by examiner

*Primary Examiner* — Mark A Deuble
(74) *Attorney, Agent, or Firm* — Hovey Williams LLP

(57) ABSTRACT

A device (1) for twisting containers (2) while moving said containers along a moving path (3) comprising an at least partly curved path portion (3A) comprising a series of guiding elements provided each with lubricating means adapted for ensuring a dry lubrication of at least a portion of the guiding elements by supplying a fluid lubricant selected from the group consisting of liquid lubricant, gazeous lubricant and mixtures thereof in at least two distinct locations of the said guiding elements.

36 Claims, 10 Drawing Sheets

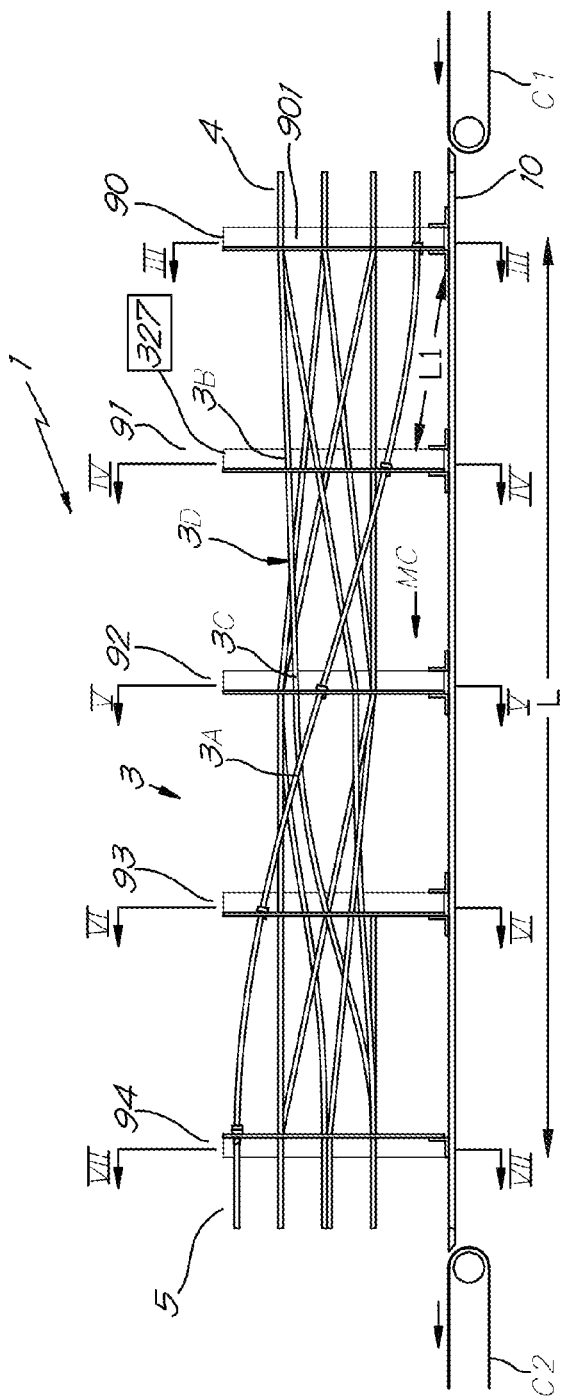
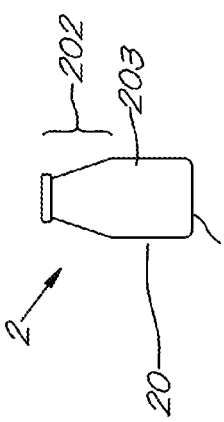

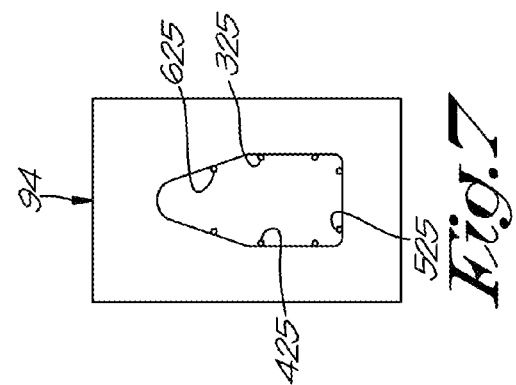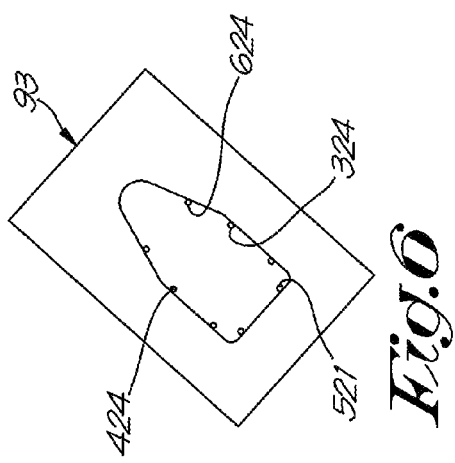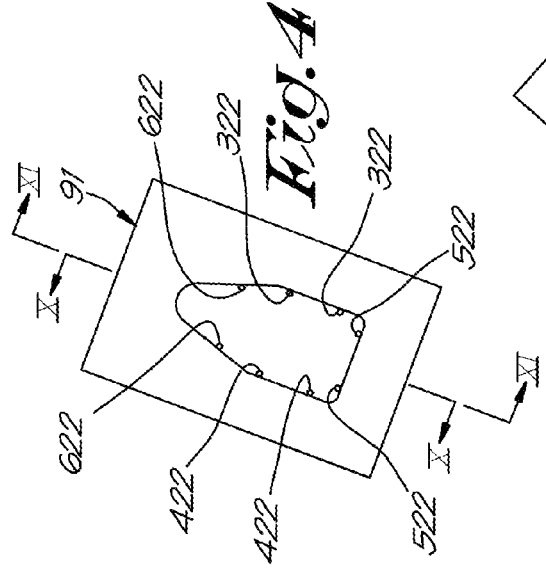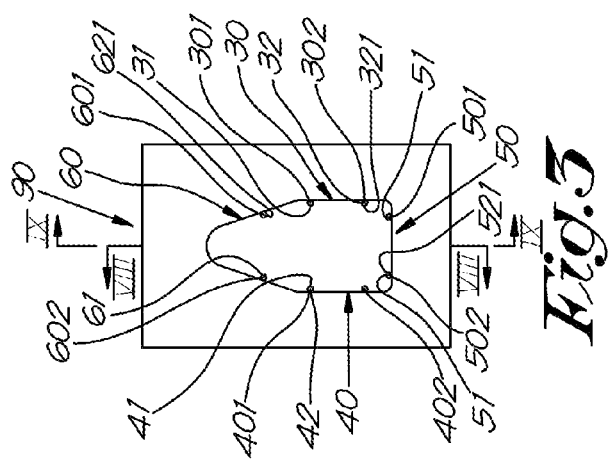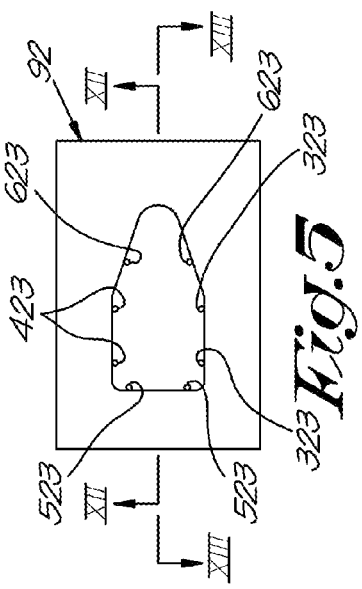

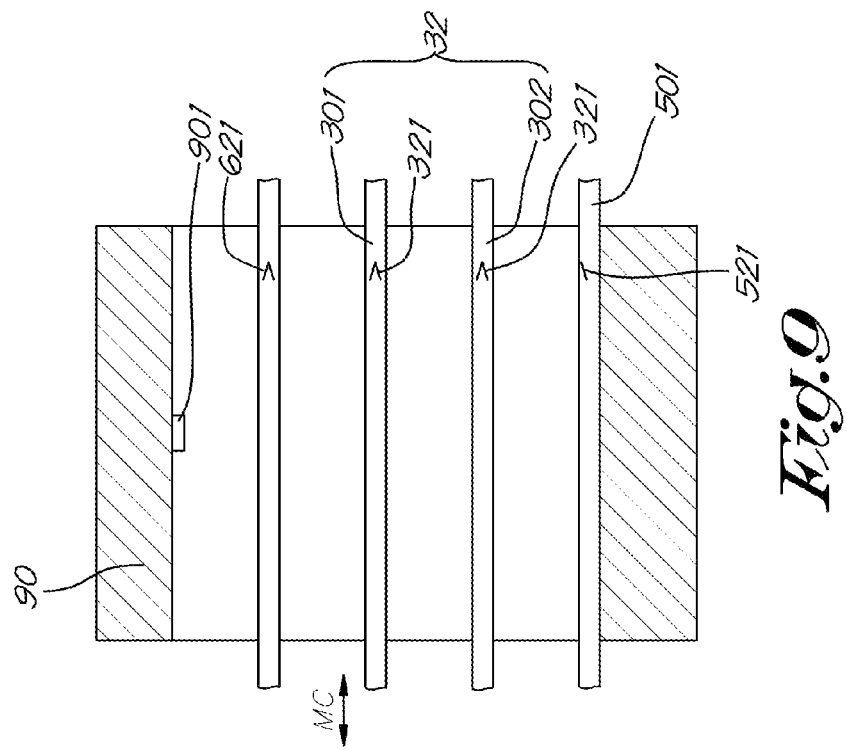
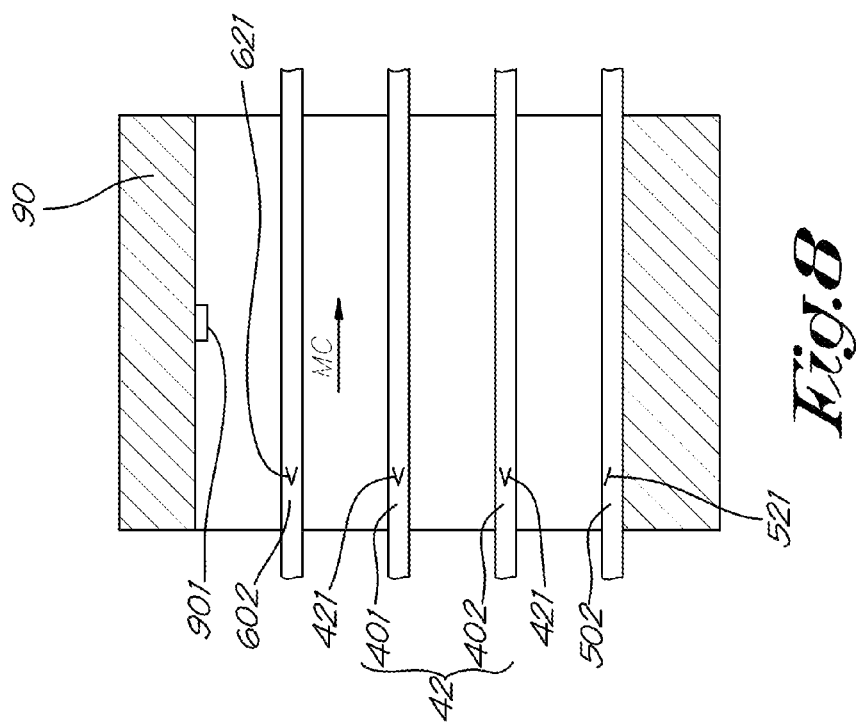

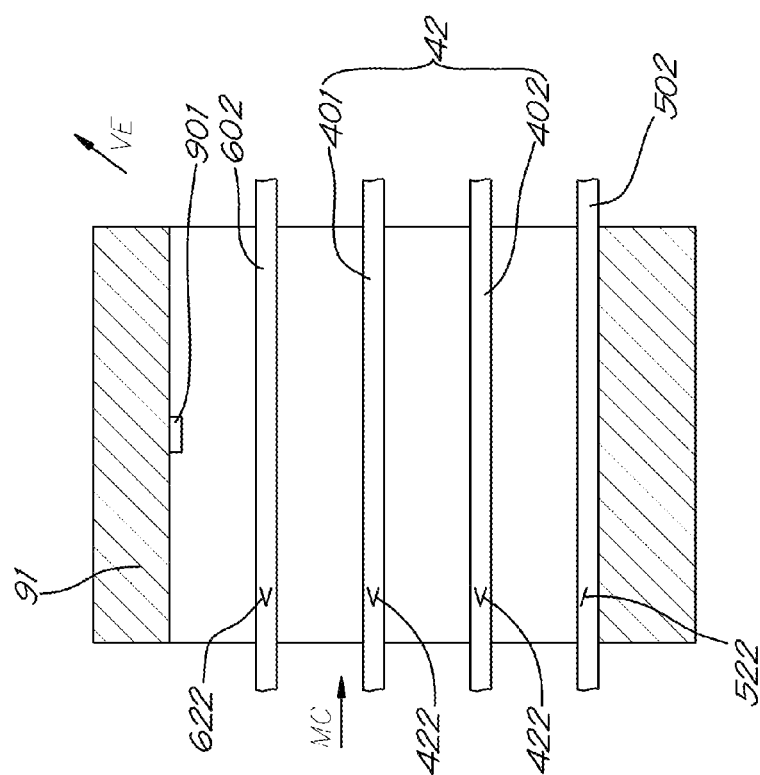
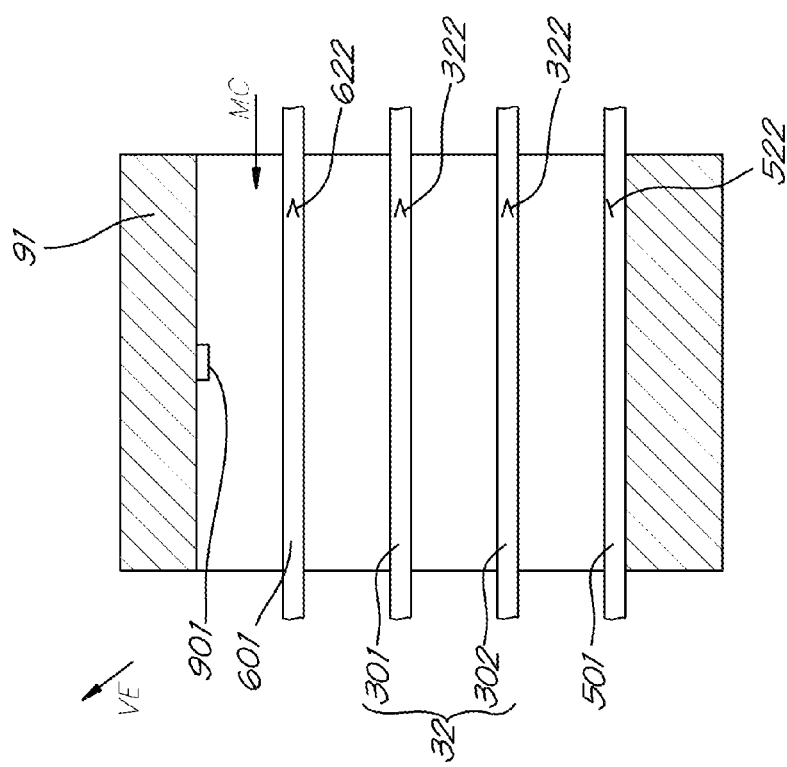

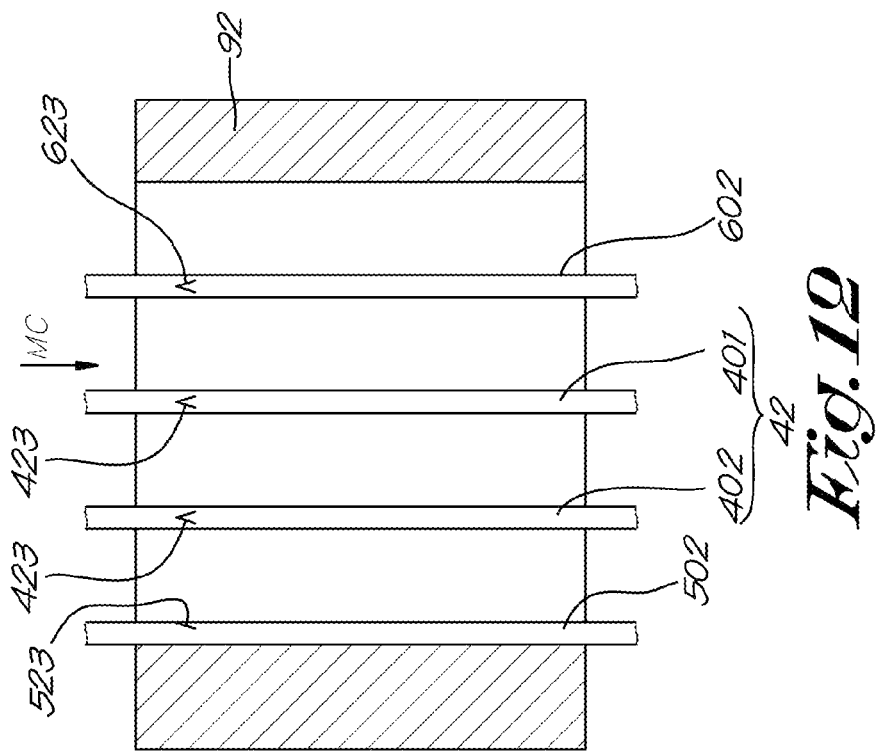
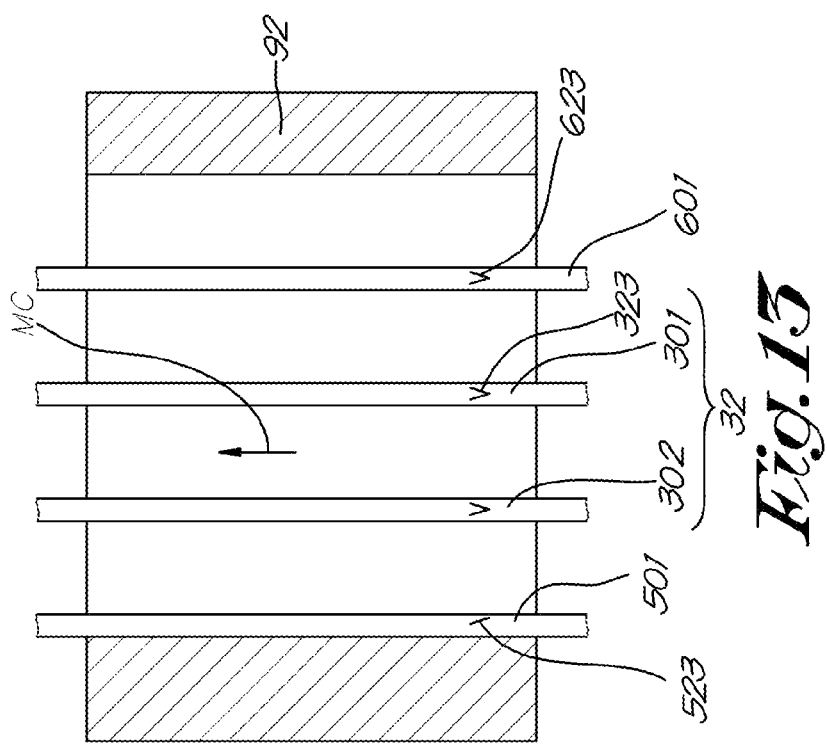

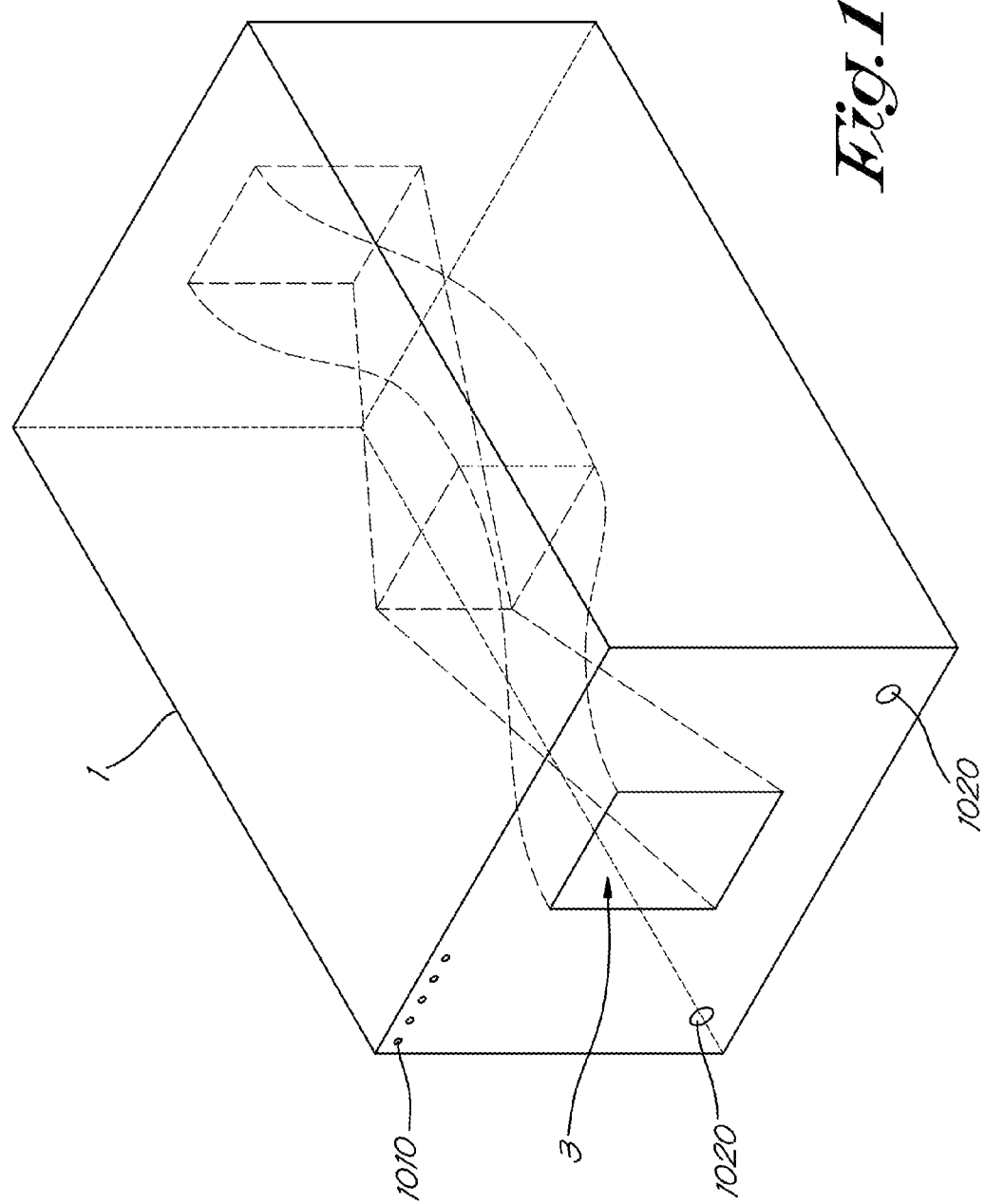

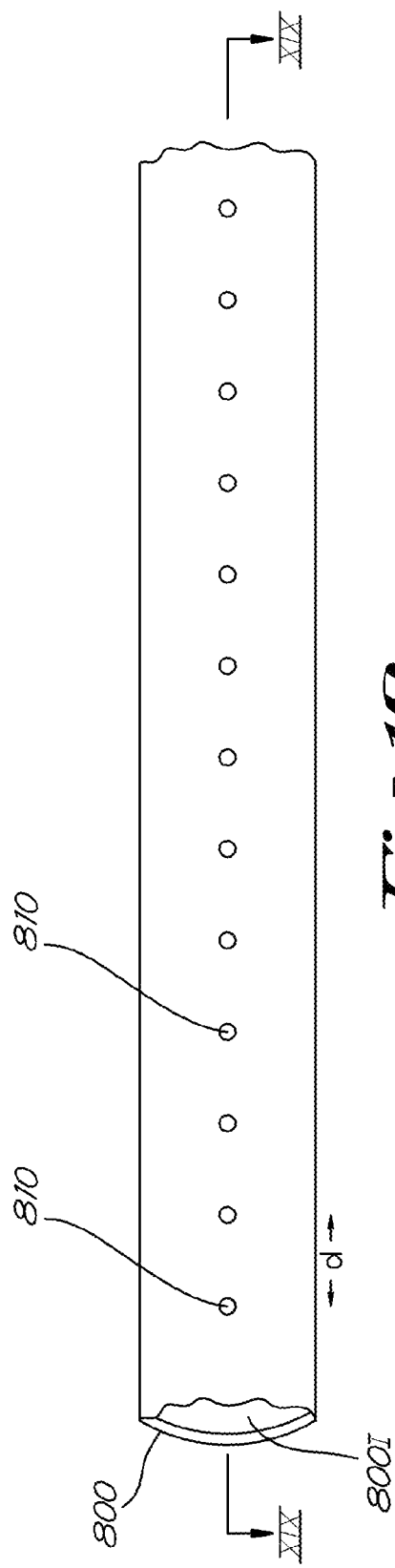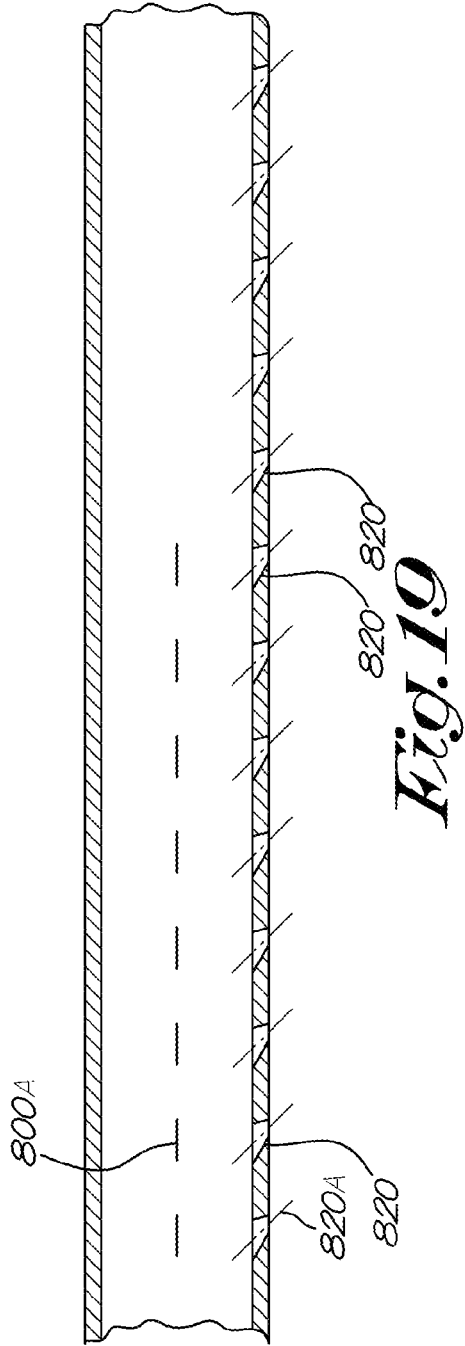

FRICTION CONTROLLED CONTAINER TWISTING DEVICE

CROSS-REFERENCE TO RELATED APPLICATION

This non-provisional patent application claims priority benefit to the prior filed International Patent Application PCT/IB 2020/056897 filed on Jul. 22, 2020, entitled "FRICTION CONTROLLED CONTAINER TWISTING DEVICE, and to the prior filed European Patent Application EP20020432.9 filed on Sep. 25, 2020, entitled "FRICTION CONTROLLED CONTAINER TWISTING DEVICE, with the entireties of both above-identified prior-filed applications being incorporated by reference into the present non-provisional patent application.

FIELD OF THE INVENTION

The invention relates to a lubricated device for twisting containers, which are used in conveyor system or conveyor installation.

BACKGROUND

It is already known to lubricate conveyors for ensuring a correct flow of containers, like cans, bottles, etc. Said conveyors comprise a moving band supporting the bottles or containers, so as to convey the said bottles or containers towards a specific station.

In the existing twisting devices, the containers are entering in the twisting device with the speed of the preceding transport conveyor. The containers are turned or twisted mostly 90° or 180° without any additional driving force in the twisting device. The friction in the contact areas between the containers and the supporting or guiding surfaces of the device is controlled by spraying large amount of water. By using such large amount of water, it has been possible to prevent blockage during the movement of the containers. Said large amount of water is often sprayed at least at the entrance stroke of the the device, but advantageously substantially along the whole twisting path of the device.

For reducing the water consumption, it has been proposed to use a water collector adapted to collect at least part of the huge volume of water flowing through the twisting device. However, said collected water has to be treated before new spraying on the containers.

The containers flowing through the existing devices are thus wetted, whereby the said containers leaving the twisting device have to be dried, in order to prevent a wetting of the followed moving belt, for example intended to convey the bottles towards a packaging installation.

Said huge amount of water is also a source of many drawbacks, such as contamination, accidents for the workers, health problems, blocking problem of containers, problem with glued tags or papers, for containers leaving the wet twisting operation, problems linked for further adhesion of tags, papers, labels, etc.

Mechanical twisting devices are for example disclosed in U.S. Pat. No. 3,797,641; in U.S. Pat. No. 6,116,401; in GB 1296189. Such mechanical twisting devices are submitted to a wearing, especially when the flow of containers is high. The wearing of parts of the twisting device can cause damages to the containers, which can lead to huge financial losses.

BRIEF DESCRIPTION OF THE INVENTION

The invention relates to a device for twisting containers in a very safe way, while preventing the use of said huge amount of waters, and while keeping the surfaces of the containers dry, while preventing any possible damages of labels, tags, etc. present on the containers' outer face before being twisted. The device of the invention enables also to prevent substantially any blockage of containers in the twisting device, even with high container flow.

It has also been observed that with the device of the invention, the wearing of the parts in contact with the moving containers can be reduced, reducing in this manner any damages to the containers and labels or tags present on them, while reducing possible heating of twisting elements or rods.

The invention relates to a device (1) for twisting containers (2) while moving said containers along a moving path (3) comprising an at least partly curved path portion (3A) comprising a series of guiding elements provided each with lubricating means adapted for ensuring a dry lubrication of at least a portion of the guiding elements by supplying a fluid lubricant selected from the group consisting of liquid lubricant, gazeous lubricant and mixtures thereof in at least two distinct locations of the said guiding elements. The device of the invention enables to control the friction of the containers moving along the at least partly curved guiding elements and thus during the twisting of the containers in the device of the invention.

The device of the invention is a device (1) for twisting containers (2) while moving said containers (having each an outer facing system, such as one or more lateral faces, a top face and a bottom face) along a moving path (3) comprising an at least partly curved path portion (3A) with an at least partly curved length path comprised between 30 cm and 500 cm for ensuring that each container (2) moving through the said curved path portion follows at least a curved movement, said containers (2) having at least an outer facing system (20), said at least partly curved path portion (3A) extending between an inlet (4) for containers into the at least partly curved path portion (3A) and an outlet (5) for containers (2) after moving through the at least partly curved path portion (3A).

In the device of the invention, between said inlet (4) and outlet (5), the at least partly curved path portion (3A) comprises at least:

a support (10);

a first guiding element (30) attached to said support (10), said first guiding element (30) having at least a first guiding face element (31) (advantageously a plurality, such as two or three distinct guiding face elements) adapted for contacting (each in the case of a plurality) at least a first portion of the outer facing system (20) of the containers (2) moving in the at least partly curved path portion (3A);

a second guiding element (40) attached to said support (10), said second guiding element (40) having at least a second guiding face element (41) (advantageously a plurality, such as two or three distinct guiding face elements) distant from the first guiding face element (31) and adapted for contacting (each in the case of a plurality) at least a second portion of the outer facing system (20) of the container (2) moving in the at least partly curved path portion (3A), said second portion of the outer facing system (20) of the containers being different from the first portion of the outer facing system (20) of the containers (2);

a first lubricating means (32) adapted for ensuring a dry lubrication of at least a portion of the first guiding element (30) by supplying a fluid lubricant selected from the group consisting of liquid lubricant, gazeous lubricant and mixtures thereof or even combinations there of (possibly once a liquid lubricant is used, while at another place or time, a gazeous lubricant is used) along the first guiding face element (31), whereby the first lubricating means (32) has at least (a) a first outlet open element (321) along the the first guiding face element (31) with an open outer surface of less than 100 mm² (such as less than 75 mm², less than 50 mm², less than 25 mm², such as less 15 mm², preferably less than 10 mm² or even more preferably equal or less than 5 mm²), (b) a second outlet open element (322) along the first guiding face element (31) with an open surface of less than 100 mm² (such as less than 75 mm², less than 50 mm², less than 25 mm², such as less 15 mm², preferably less than 10 mm² or even more preferably equal or less than 5 mm²), said second outlet open element (322) being distant from the first outlet open element (321) by an at least partly curved path distance of at least 10 cm (the first lubricating means can have more than two outlet open elements, but in this case at least one first and another are distant of more than 10 cm. One or more outlet open elements can be present between said first and another outlet open elements. For example when using a gazeous lubricant, such as dry air, nitrogen, etc., the outlet open elements are located the one after another on a length path of at least 20 cm, with a distance between two successive outlet open elements of 1cm to 5 cm, for example), and (c) a supply connecting system (366) connecting the first outlet open element (321) and the second outlet open element (322) to a connector (327) adapted to be connected to a lubricant supply (100) for supplying said first outlet open element (321) and said second outlet open element (322) of the first lubricating means (32) with the fluid lubricant; and a second lubricating means (42) adapted for ensuring a dry lubrication of at least a portion of the second guiding element (40) by supplying the fluid lubricant along the second guiding face element (41), whereby the second lubricating means (42) has at least (a) a first outlet open element (421) along the the second guiding face element (41) with an open outer surface of less than 100 mm² (such as less than 75 mm², less than 50 mm², or even less than 25 mm², such as less 15 mm², preferably less than 10 mm² or even more preferably equal or less than 5 mm²), (b) a second outlet open element (422) along the second guiding face element (41) with an open surface of less than 100 mm² (such as less than 75 mm², less than 50 mm², less than 25 mm², such as less 15 mm², preferably less than 10 mm² or even more preferably equal or less than 5 mm²), said second outlet open element (422) of the second lubricating means (42) being distant from the first outlet open element (421) of the second lubricating means (42) by a at least partly curved path distance of at least 10 cm (for example from 20 cm up to 50 cm or even more), and (c) a supply connecting system (466) connecting at least the first outlet open element (421) and the second outlet open element (422) of the second lubricating means (42) to a connector (427) adapted to be connected to a or the lubricant supply (100,110) for supplying said first outlet open element (421) and said second outlet open element (422) of the second lubricating means (42) with the fluid lubricant.

The fluid lubricant is for example a liquid lubricant supplied to the outlet open elements at very low rate, such as per outlet open element, from 0.5 to 500 mm³ (such as from 10 mm³ up to 300 mm³, advantageously from 20 mm³ upto 250 mm³, for example 30, 50, 65, 90, 100, 150 and 200 mm³) of liquid lubricant per hour. Possible advantageous liquid lubricant is for example DLT-333, a food grade white mineral oil with PTFE and wax. The liquid lubricant is supplied in successive steps, with periods of no supply. For example, periods of supply of liquid lubricant are separated by a period of no supply of liquid lubricant. The duration of a period of supply of liquid lubricant at one outlet open element can be from 1 second up to 300 seconds, such as 5 to 200 seconds, advantageously from 10 to 100 seconds, like 20, 30, 40 and 60 seconds. The duration of periods of no supply of liquid lubricant between two periods of liquid lubricant supply can be from 10 seconds upto 600 seconds, such as from 30 seconds upto 500 seconds. The duration of a supply period and of a non supply period can be controlled in function of the container flow rate.

The fluid lubricant can also be a gazeous lubricant under pressure, such as under a pressure of $2\times10^5$ Pa upto $50\times10^5$ Pa, like $3\times10^5$ Pa, $5\times10^5$ Pa, $10\times10^5$ Pa and $20\times10^5$ Pa. The gas can be air, dried air, filtered air, air enriched with one or more additives, nitrogen, $CO_2$, etc. The gas temperature can be comprised between $-20°$ C. and $+50°$ C., but is preferably comprised between $0°$ C. and $+25°$ C., most preferably between $+10°$ C. and $+20°$ C. The gas speed at the outlet open element is for example comprised between 0.1 m/s upto 10 m/s, such as 0.2, 0.5, 1.0, 2.0 m/s. The gazeous lubricant can be expelled substantially continuously at a rate from 0.01 up to 10 liter/second (volume determined at a temperature of $20°$ C. and a pressure of $1\times10^5$ Pa), such as 0.05 l/s, 0.1 l/s, 0.5 l/s, 1 l/s, 3 l/s and 5 l/s.

The outlet open elements are advantageously located along a face portion directed at least partly upwardly, preferably only upwardly, or at least partly vertically or substantially vertically, so as to prevent as much as possible gravity flow of liquid lubricant from the outlet open elements.

When using gazeous lubricant, the outlet open elements are advantageously adapted so that at least a portion of the gazeous lubricant can give an impulse on the containers moving through the at least partly curved path 3A, said impulse being directed on the containers in a direction having at least a component in the direction of their movement, and preferably also in their twisting movement, whereby easing further the twisting of the containers along the path 3A.

According to advantageous embodiments of the device of the invention, the device has one or more of the following details or characteristics:

at least one of the first outlet open element (321) and the second outlet open element (322) of the first lubricating means (32) and at least one of the first outlet open element (421) and the second outlet open element (422) of the second lubricating means (42) have an outer form selected from the group consisting of a substantially circular outer form with an outer diameter comprised between 0.5 mm and 5 mm (advantageously from 1 mm upto 4 mm, such as 1 mm, 2 mm and 3 mm), a substantially ellipse outer form with an equivalent diameter comprised between 0.5 mm and 5 mm (advantageously from 1 mm upto 4 mm, such as 1 mm, 2 mm and 3 mm), an elongated outer form with an average width comprised between 0.5 mm and 5 mm (advantageously from 1 mm upto 4 mm, such as 1 mm, 2 mm and 3 mm) and an average length greater than the average width, but comprised between 3 mm and 50 mm (advantageously 5 mm upto 30 mm, such as 5 mm, 10 mm, 15 mm), and combinations of parts thereof. The equivalent diameter is equal to 4 times the open surface divided by the circumference of the opening.

at least one of the first outlet open element (321) and the second outlet open element (322) of the first lubricating means (32) and at least one of the first outlet open element (421) and the second outlet open element (422) of the second lubricating means (42) have the form of a groove (G) with an average width comprised between 0.5 mm and 5 mm (for example advantageously comprised between 1 and 4 mm, such as 2 mm, 3 mm and 4 mm) and an average length (L) greater than the average width and comprised between 3 mm and 50 mm (for example from 5 mm upto 20 mm). The groove (G) can have various shapes, and can have the shape of two groove portions connected at one of their ends.

the first guiding face element (31) of the first guiding element (30) defines an at least partly curved surface adapted to contact substantially continuously a portion of an outer facing system (20) of the container (2) selected from the group consisting of a linear zone with a width of less than 0.5 cm (such as less than 2 mm, or even 1 mm), and a surface zone of less than 5 mm$^2$ (such as less than 3 mm$^2$, 2 mm$^2$ or even less than 1 mm$^2$, the said surface being then preferably like a punctual contact surface), while the second guiding face element (41) of the second guiding element (40) defines an at least partly curved surface adapted to contact substantially continuously a portion of an outer facing system (20) of the container (2) selected from the group consisting of a linear zone ith a width of less than 0.5 cm (such as less than 2 mm, or even 1 mm), and a surface zone of less than 5 mm$^2$ (such as less than 3 mm$^2$, 2 mm$^2$ or even less than 1 mm$^2$, the said surface being then preferably like a punctual contact surface).

the first guiding element (31) comprises at least two first guiding face elements distant from each other and selected from the group consisting of at least partly curved rods and at least partly curved elongated elements (301,302), each of said at least two first guiding face elements (301,302) of the first guiding element (31) when defolded in a substantially straight shape having a substantially curved contact face defining a linear contact face adapted to contact substantially continuously a portion of an outer facing system (20) of the container (2) when moving in the device, said linear contact face having a a width of less than 0.5 mm (such as from 0.1 mm up to 0.4 mm or even lesser), while the second guiding element (41) comprises at least two second guiding face elements distant from each other and selected from the group consisting of at least partly curved rods and at least partly curved elongated elements (401,402), each of said at least two second guiding face elements (401,402) of the second guiding element (41) when defolded in a substantially straight shape having a substantially curved contact face defining a linear contact face adapted to contact substantially continuously a portion of an outer facing system (20) of the container (2) when moving in the device, said linear contact face having a a width of less than 0.5 mm (for example from 0.1 mm up to 0.4 mm or even lesser).

the curved or partly curved rods or curved or partly curved elongated elements (301,302; 401,402) of the first guiding element (31) and/or of the second guiding element (41) are each provided with at least a first passage or channel ending into a first outlet open element (321,421) and a second passage or channel ending into a second outlet open element (322,422) of the first lubricating means (32) or the second lubricating means (42), whereby with respect to the said curved or partly curved rods or curved or partly curved elongated elements (301,302; 401,402) when defolded in a substantially straight shape, the said first outlet open element (321,421) and the said second outlet open element (322, 422) of each curved or partly curved rod or curved or partly curved elongated elements (301,302;401,402) extend along a substantially flat face of the rod or elongated elements (301,302;401,402) taken into consideration with a width of less than 0.5 mm, said first outlet open element (321,421) and said second outlet open element (322, 422) being distant by a distance of at least 10 cm. (for example from 10 cm up to 100 cm, such as 20 cm, 30 cm, 50 cm, 75 cm as example only)

The device is adapted for moving containers (2) having an outer facing system (20) comprising a bottom face (201), a top face (202) and at a lateral facing system (203), whereby the at least partly curved path portion (3A) comprises at least:

a first guiding element (30) attached to said support (10), said first guiding element (30) having a first guiding face element (31) adapted for contacting at least a first portion of the lateral facing system (203) of the container (2) moving in the at least partly curved path portion (3A);

a second guiding element (40) attached to said support (10), said second guiding element (40) having a second guiding face element (41) distant from the first guiding face element (31) and adapted for contacting at least a second portion of the lateral facing system (203) of the container (2) moving in the at least partly curved path portion (3A), said second portion of the lateral facing system (203) being different from the first portion of the lateral facing system (203) of the container (2);

a third guiding element (50) attached to said support (10), said third guiding element (50) having a third guiding face element (51) adapted for contacting at least a portion of the bottom face (201) of the container (2) moving in the at least partly curved path portion (3A);

a first lubricating means (32) adapted for ensuring a dry lubrication of at least a portion of the first guiding element (30) by supplying the fluid lubricant along the first guiding face element (31), whereby the first lubricating means (32) has at least (a) a first outlet open element (321) along the first guiding face element (31) with an open outer surface of less than 100 mm$^2$ (such as less than 75 mm$^2$, less than 50 mm$^2$, less than 25 mm$^2$, such as less 15 mm$^2$, preferably less than 10 mm$^2$ or even more preferably equal or less than 5 mm$^2$), (b) a second outlet open element (322) along the first guiding face element (31) with an open surface of less than 100 mm$^2$ (such as less than 75 mm$^2$, less than 50 mm$^2$, less than 25 mm$^2$, such as less 15 mm$^2$, preferably less than 10 mm$^2$ or even more preferably equal or less than 5 mm$^2$), said second outlet open element (322) being distant from the first outlet open element (321) by a at least partly curved path distance of at least 10 cm, and (c) a supply connecting system (366) connecting the first outlet open element (321) and the second outlet open element (322) to a connector (327) adapted to be connected to a lubricant supply (100) for supplying said first outlet open element (321) and said second outlet open element (322) of the first lubricating means (32) with the fluid lubricant;

a second lubricating means (42) adapted for ensuring a dry lubrication of at least a portion of the second guiding element (40) by supplying the fluid lubricant along the second guiding face element (41), whereby the first lubricating means (42) has at least (a) a first outlet open element (421) along the the second guiding face element (41) with an open outer surface of less than 100 mm$^2$ (such as less than 75 mm$^2$, less than 50 mm$^2$, less than 25 mm$^2$, such as less 15 mm$^2$, preferably less than 10 mm$^2$ or even more preferably equal or less than 5 mm$^2$), (b) a second outlet open element (422) along the second guiding face element (41) with an open surface of less than 100 mm$^2$ (such as less than 75 mm$^2$, less than 50 mm$^2$, less than 25 mm$^2$, such as less 15 mm$^2$, preferably less than 10 mm$^2$ or even more preferably equal or less than 5 mm$^2$), said second outlet open element (422) being distant from the first outlet open element (421) by an at least partly curved path distance of at least 10 cm, and (c) a supply connecting system (466) connecting the first outlet open element (421) and the second outlet open element (422) to a connector (427) adapted to be connected to a or the lubricant supply (100,110) for supplying said first outlet open element (421) and said second outlet open element (422) of the second lubricating means (42) with the fluid lubricant, and a third lubricating means (52) adapted for ensuring a dry lubrication of at least a portion of the third guiding element (50) by supplying the fluid lubricant along the third guiding face element (51), whereby the third lubricating means (52) has at least (a) a first outlet open element (521) along the third guiding face element (51) with an open outer surface of less than 100 mm$^2$ (such as less than 75 mm$^2$, less than 50 mm$^2$, less than 25 mm$^2$, such as less 15 mm$^2$, preferably less than 10 mm$^2$ or even more preferably equal or less than 5 mm$^2$), (b) a second outlet open element (522) along the third guiding face element (51) with an open surface of less than 100 mm$^2$ (such as less than 75 mm$^2$, less than 50 mm$^2$, less than 25 mm$^2$, such as less 15 mm$^2$, preferably less than 10 mm$^2$ or even more preferably equal or less than 5 mm$^2$), said second outlet open element (522) being distant from the first outlet open element (521) by an at least partly curved path distance of at least 10 cm, and (c) a supply connecting system (566) connecting the first outlet open element (521) and the second outlet open element (522) to a connector (527) adapted to be connected to a or the lubricant supply (100, 110, 120) for supplying said first outlet open element (521) and said second outlet open element (522) of the third lubricating means (52) with the fluid lubricant.

The lubricant supply system can be one single lubricant supply system for supplying the various guiding face elements, but can also comprises different units, each unit being the adapted for supplying one or more guiding face elements or part(s) thereof with one specific lubricant.

at least one of the first and second outlet open elements (321,322) of the first lubricating means (32), at least one of the first and second outlet open elements (421,422) of the second lubricating means (42) and at least one of the first and second outlet open elements (521,522) of the third lubricating means (52) have the form of a groove (G) with an average width comprised between 0.5 mm and 5 mm (such as 1 mm, 2 mm, 3 mm and 4 mm) and an average length (L) greater than the average width and comprised between 3 mm and 50 mm, such as from 0.5 cm up to 2 cm, said groove having for example an average width of about 1 to 3 mm (average measured with respect to the length of the groove).

the first guiding face element (31) of the first guiding element (30) defines an at least partly curved surface (31) contacting substantially continuously a portion of the lateral facing system (203) selected from the group consisting of a linear zone with a width of less than 0.5 cm (such as less than 2 mm, or even 1 mm), and a surface zone of less than 5 mm$^2$ (such as less than 3 mm$^2$, 2 mm$^2$ or even less than 1 mm$^2$, the said surface being then preferably like a punctual contact surface) of the lateral facing system (203) of the container (2), in which the second guiding face element (41) of the second guiding element (40) defines an at least partly curved surface (41) adapted to contact substantially continuously a portion of the lateral facing system (203) selected from the group consisting of a linear zone with a width of less than 0.5 cm (such as less than 2 mm, or even 1 mm), and a surface zone of less than 5 mm$^2$ (such as less than 3 mm$^2$, 2 mm$^2$ or even less than 1 mm$^2$, the said surface being then preferably like a punctual contact surface) of the lateral facing system (203) of the container (2), and in which the third guiding face element (51) of the third guiding element (50) defines an at least partly curved surface (51) contacting substantially continuously at least a portion of the bottom face (201) of the container (2) selected from the group consisting of a linear zone with a width of less than 0.5 cm (such as less than 2 mm, or even 1 mm), and a surface zone of less than 5 mm$^2$ (such as less than 3 mm$^2$, 2 mm$^2$ or even less than 1 mm$^2$, the said surface being then preferably like a punctual contact surface) of the bottom face (201) of the container.

the device is adapted for moving containers (2) having an outer facing system (20) comprising a bottom face (201), a top face (202) and at a lateral facing system (203), whereby the at least partly curved path portion (3A) comprises at least:

a first guiding element (30) attached to said support (10), said first guiding element (30) having at least a first guiding face element (31) adapted for contacting at least a first portion of the lateral facing system (203) of the container (2) moving in the at least partly curved path portion (3A);

a second guiding element (40) attached to said support (10), said second guiding element (40) having at least a second guiding face element (41) distant from the first guiding face element (31) and adapted for contacting at least a second portion of the lateral facing system (203) of the container (2) moving in the at least partly curved path portion (3A), said second portion of the lateral facing system (203) being different from the first portion of the lateral facing system (203) of the container (2);

a third guiding element (50) attached to said support (10), said third guiding element (50) having a third guiding face element (51) adapted for contacting at least a portion of the bottom face (201) of the container (2) moving in the at least partly curved path portion (3A);

a fourth guiding element (60) attached to said support (10), said fourth guiding element (60) having a fourth guiding face element (61) adapted for contacting at least a second portion of the top face (202) of the container (2) moving in the at least partly curved path portion (3A);

a first lubricating means (32) adapted for ensuring a dry lubrication of at least a portion of the first guiding element (30) by supplying the fluid lubricant along the first guiding face element (31), whereby the first lubricating means (32) has at least (a) a first outlet open element (321) along the first guiding face element (31) with an open outer surface of less than 100 mm$^2$ (such as less than 75 mm$^2$, less than 50 mm$^2$, less than 25 mm$^2$, such as less 15 mm$^2$, preferably less than 10 mm$^2$ or even more preferably equal or less than 5 mm$^2$), (b) a second outlet open element (322) along the first guiding face element (31) with an open surface of less than 100 mm$^2$ (such as less than 75 mm$^2$, less than 50 mm$^2$, less than 25 mm$^2$, such as less 15 mm$^2$, preferably less than 10 mm$^2$ or even more preferably equal or less than 5 mm$^2$), said second outlet open element (322) being distant from the first outlet open element (321) by a at least partly curved path distance of at least 10 cm, and (c) a supply connecting system (366) connecting the first outlet open element (321) and the second outlet open element (322) to a connector (327) adapted to be connected to a lubricant supply (100) for supplying said first outlet open element (321) and said second outlet open element (322) of the first lubricating means (32) with the fluid lubricant;

a second lubricating means (42) adapted for ensuring a dry lubrication of at least a portion of the second guiding element (40) by supplying the fluid lubricant along the second guiding face element (41), whereby the first lubricating means (42) has at least (a) a first outlet open element (421) along the the second guiding face element (41) with an open outer surface of less than 100 mm$^2$ (such as less than 75 mm$^2$, less than 50 mm$^2$, less than 25 mm$^2$, such as less 15 mm$^2$, preferably less than 10 mm$^2$ or even more preferably equal or less than 5 mm$^2$), (b) a second outlet open element (422) along the second guiding face element (41) with an open surface of less than 100 mm$^2$ (such as less than 75 mm$^2$, less than 50 mm$^2$, less than 25 mm$^2$, such as less 15 mm$^2$, preferably less than 10 mm$^2$ or even more preferably equal or less than 5 mm$^2$), said second outlet open element (422) being distant from the first outlet open element (421) by an at least partly curved path distance of at least 10 cm, and (c) a supply connecting system (466) connecting the first outlet open element (421) and the second outlet open element (422) to a connector (427) adapted to be connected to a or the lubricant supply (100,110) for supplying said first outlet open element (421) and said second outlet open element (422) of the second lubricating means (42) with the fluid lubricant, and a third lubricating means (52) adapted for ensuring a dry lubrication of at least a portion of the third guiding element (50) by supplying the fluid lubricant along the third guiding face element (51), whereby the third lubricating means (52) has at least (a) a first outlet open element (521) along the third guiding face element (51) with an open outer surface of less than 100 mm$^2$ (such as less than 75 mm$^2$, less than 50 mm$^2$, less than 25 mm$^2$, such as less 15 mm$^2$, preferably less than 10 mm$^2$ or even more preferably equal or less than 5 mm$^2$), (b) a second outlet open element (522) along the third guiding face element (51) with an open surface of less than 100 mm$^2$, said second outlet open element (522) being distant from the first outlet open element (521) by an at least partly curved path distance of at least 10 cm, and (c) a supply connecting system (566) connecting the first outlet open element (521) and the second outlet open element (522) to a connector (527) adapted to be connected to a or the lubricant supply (100, 110, 120) for supplying said first outlet open element (521) and said second outlet open element (522) of the third lubricating means (52) with the fluid lubricant, and a fourth lubricating means (62) adapted for ensuring a dry lubrication of at least a portion of the fourth guiding element (60) by supplying the fluid lubricant along the fourth guiding face element (61), whereby the fourth lubricating means (62) has (a) a first outlet open element (621) along the the fourth guiding face with an open outer surface of less than 100 mm$^2$ (such as less than 75 mm$^2$, less than 50 mm$^2$, less than 25 mm$^2$, such as less 15 mm$^2$, preferably less than 10 mm$^2$ or even more preferably equal or less than 5 mm$^2$), (b) a second outlet open element (622) along the fourth guiding face element (61) with an open surface of less than 100 mm$^2$ (such as less than 75 mm$^2$, less than 50 mm$^2$, less than 25 mm$^2$, such as less 15 mm$^2$, preferably less than 10 mm$^2$ or even more preferably equal or less than 5 mm$^2$), said second outlet open element (622) being distant from the first outlet open element (621) by a curved path distance of at least 10 cm, and (c) a supply connecting system (666) connecting the first outlet open element (621) and the second outlet open element (622) to a connector (627) adapted to be connected to a or the lubricant supply (100,110,120,130) for supplying said first outlet open element (621) and said second outlet open element (622) of the fourth lubricating means (62) with the fluid lubricant.

at least one of the first and second opening outlets (321,322) of the first lubricating means (32), at least one of the first and second opening outlets (421,422) of the second lubricating means (42), at least one of the first and second opening outlets (521,522) of the third lubricating means (52), and at least one of the first and second opening outlets (621,622) of the fourth lubricating means (62) have the form of a groove (G) with an average width comprised between 0.5 mm and 5 mm and an average length (L) greater than the average width and comprised between 3 mm and 50 mm, such as for example from 0.5 cm up to 2 cm.

the first guiding face element (31) of the first guiding element (30) defines an at least partly curved surface (303) contacting substantially continuously a portion of the lateral facing system (203) selected from the group consisting of a linear zone with a width of less than 0.5 cm and a surface zone of less than 5 mm$^2$ of the lateral facing system (203), in which the second guiding face element (41) of the second guiding element (40) defines a curved surface contacting substantially continuously a portion of the lateral facing system (203) selected from the group consisting of a linear zone a width of less than 0.5 cm (such as less than 2 mm, or even 1 mm), and a surface zone of less than 5 mm$^2$ (such as less than 3 mm$^2$, 2 mm$^2$ or even less than 1 mm$^2$, the said surface being then preferably like a punctual contact surface) of the lateral facing system (203), in which the third guiding face element (51) of the third guiding element (50) defines a curved surface contacting substantially continuously at least a portion of the bottom face (201) of the container (2) selected from the group consisting of a linear zone a width of less than 0.5 cm (such as less than 2 mm, or even 1 mm), and a surface zone of less than 5 mm$^2$ (such as less than 3 mm$^2$, 2 mm$^2$ or even less than 1 mm$^2$, the said surface being then preferably like a punctual contact surface) of the bottom face (201), and in which the fourth guiding face element (61) of the fourth guiding element (60) defines a curved surface contacting substantially continuously at least a portion of the top face (202) of the container (2) selected from the group consisting of a linear zone a width of less than 0.5 cm (such as less than 2 mm, or even 1 mm), and a surface zone of less than 5 mm$^2$ (such as less than 3 mm$^2$, 2 mm$^2$ or even less than 1 mm$^2$, the said surface being then preferably like a punctual contact surface) of the top face (202).

at least one of the first and second outlet open elements (321,322) of the first lubricating means (32), at least one of the first and second outlet open elements (421,422) of the second lubricating means (42), at least one of the first and second outlet open elements (521,522) of the third lubricating means (52), and at least one the first and second outlet open elements (621,622) of the fourth lubricating means (62) have the form of a groove (G) with an average width comprised between 0.5 mm and 5 mm and an average length (L) greater than the average width and comprised between 3 mm and 50 mm.

the first guiding face element (31) of the first guiding element (30) defines an at least partly curved surface (31) contacting substantially continuously a portion of the lateral facing system (203) selected from the group consisting of a linear zone a width of less than 0.5 cm (such as less than 2 mm, or even 1 mm), and a surface zone of less than 5 mm$^2$ (such as less than 3 mm$^2$, 2 mm$^2$ or even less than 1 mm$^2$, the said surface being then preferably like a punctual contact surface) of the lateral facing system (203), in which the second guiding face element (41) of the second guiding element (40) defines an at least partly curved surface (41) adapted to contact substantially continuously a portion of the lateral facing system (203) selected from the group consisting of a linear zone a width of less than 0.5 cm (such as less than 2 mm, or even 1 mm), and a surface zone of less than 5 mm$^2$ (such as less than 3 mm$^2$, 2 mm$^2$ or even less than 1 mm$^2$, the said surface being then preferably like a punctual contact surface) of the lateral facing system (203), in which the third guiding face element (51) of the third guiding element (50) defines an at least partly curved surface (51) contacting substantially continuously at least a portion of the bottom face (201) of the container (2) selected from the group consisting of a linear zone a width of less than 0.5 cm (such as less than 2 mm, or even 1 mm), and a surface zone of less than 5 mm$^2$ (such as less than 3 mm$^2$, 2 mm$^2$ or even less than 1 mm$^2$, the said surface being then preferably like a punctual contact surface) of the bottom face (201), and in which the fourth guiding face element (61) of the fourth guiding element defines an at least partly curved surface (61) contacting substantially continuously at least a portion of the top face (202) of the container selected from the group consisting of a linear zone a width of less than 0.5 cm (such as less than 2 mm, or even 1 mm), and a surface zone of less than 5 mm$^2$ (such as less than 3 mm$^2$, 2 mm$^2$ or even less than 1 mm$^2$, the said surface being then preferably like a punctual contact surface) of the top face (202).

the first lubricating means (32) is adapted for ensuring a dry lubrication of at least a portion of the first guiding element (30) by supplying the fluid lubricant along the first guiding face element (31), whereby the first lubricating means (32) has at least (a) a first outlet open element (321) along the the first guiding face element (31) with an open outer surface of less than 100 mm$^2$ (such as less than 75 mm$^2$, less than 50 mm$^2$, less than 25 mm$^2$, such as less 15 mm$^2$, preferably less than 10 mm$^2$ or even more preferably equal or less than 5 mm$^2$), (b) a second outlet open element (322) along the first guiding face element (31) with an open surface of less than 100 mm$^2$ (such as less than 75 mm$^2$, less than 50 mm$^2$, less than 25 mm$^2$, such as less 15 mm$^2$, preferably less than 10 mm$^2$ or even more preferably equal or less than 5 mm$^2$), said second outlet open element being distant from the first outlet open element by an at least partly curved path distance of at least 50 cm, (c) a third outlet open element (323) along the first guiding face element (31) with an open surface of less than 100 mm$^2$ (such as less than 75 mm$^2$, less than 50 mm$^2$, less than 25 mm$^2$, such as less 15 mm$^2$, preferably less than 10 mm$^2$ or even more preferably equal or less than 5 mm$^2$), said third outlet open element being distant from the first outlet open element (321) by an at least partly curved path distance of at least 100 cm and from the second outlet open element (322) by a distance of at least 50 cm, and (d) a supply connecting system (366) connecting the first outlet open element (321), the second outlet open element (322) and the third outlet open element (323) to at least a connector (327) adapted to be connected to a lubricant supply (100) for supplying said first outlet open element (321), said second outlet open element (322) and said third outlet open element (323) of the first lubricating means (32) with the fluid lubricant; and in which the second lubricating means (42) is adapted for ensuring a dry lubrication of at least a portion of the second guiding element (40) by supplying the fluid lubricant along the second guiding face element (41), whereby the second lubricating means (42) has at least (a) a first outlet open element (421) along the the first guiding face element (41) with an open outer surface of less than 100 mm$^2$ (such as less than 75 mm$^2$, less than 50 mm$^2$, less than 25 mm$^2$, such as less 15 mm$^2$, preferably less than 10 mm$^2$ or even more preferably equal or less than 5 mm$^2$), (b) a second outlet open element (422) along the first guiding face element (41) with an open surface of less than 100 mm$^2$ (such as less than 75 mm$^2$, less than 50 mm$^2$, less than 25 mm$^2$, such as less 15 mm$^2$, preferably less than 10 mm$^2$ or even more preferably equal or less than 5 mm$^2$), said second outlet open element (422) being distant from the first outlet open element by an at least partly curved path distance of at least 50 cm, (c) a third outlet open element (423) along the second guiding face element (41) with an open surface of less than 100 mm$^2$ (such as less than 75 mm$^2$, less than 50 mm$^2$, less than 25 mm$^2$, such as less 15 mm$^2$, preferably less than 10 mm$^2$ or even more preferably equal or less than 5 mm$^2$), said third outlet open element (423) being distant from the first outlet open element (421) by an at least partly curved path distance of at least 100 cm and from the second outlet open element (422) by a distance of at least 50 cm, and (d) a supply connecting system (466) connecting the first outlet open element (421), the second outlet open element (422) and the third outlet open element (423) to at least a connector (427) adapted to be connected to a or the lubricant supply (100,110) for supplying said first outlet open element (421), said second outlet open element (422) and said third outlet open element (423) of the second lubricating means with the fluid lubricant.

at least for the first and second lubricating means (32,42), each of the first outlet open element (321,421) and the second outlet open element (322,422) is associated with a distinct means for controlling the supply of lubricant.

the device comprising a series of lubricating means selected from the group consisting of at least the first and second lubricating means (32,42), as well as at least one of the third and fourth lubricating means (52,62), each of the at least first outlet open element and second outlet open elements (321,322,421,422,521,522,621,622) of the said series of lubricating means is associated with a distinct means (900) for controlling the supply of lubricant to the outlet open element in consideration.

The device comprises a centralised supply system (1000, 100,110,120,130,140) adapted for supplying and/or for controlling the supply of lubricant under pressure at least to the first lubricating means (32) and to the second lubricating means (42), as well as advantageously at least to one of the third lubricating means (52) and/or fourth lubricating means (62).

The device comprises a guiding box (200) provided with at least the first guiding element (30) and the second guiding element (40), and possibly the third and/or fourth guiding elements (50,60).

the moving path (3) comprising the at least partly curved path portion or portions (3A) with an at partly curved length path comprised between 50 cm and 300 cm comprises at least a first substantially linear path portion (3B) and a second substantially linear path portion (3C) distant from the first substantially linear path portion (3B), whereby a curved path portion (3D) is located between the said first substantially linear path portion (3B) and the said second substantially linear path portion (3C), and whereby the first outlet open element (321) of the first lubricating means (32) and the first outlet open element (421) of the second lubricating means (42) are located in the first substantially linear path portion (3B) for ensuring a dry lubrication of respectively at least a substantially linear portion of the first guiding element (30) and at least a substantially linear portion of the second guiding element (40).

the first outlet open element (521) of the third lubricating means (52) and/or the first outlet open element (621) of the fourth lubricating means (62) is/are located in the first substantially linear path portion (3B) of the moving path (3) for ensuring a dry lubrication of respectively at least a substantially linear portion of the third guiding element (50) and/or at least a substantially linear portion of the fourth guiding element (60).

the second outlet open element (322) of the first lubricating means (32) and the second outlet open element (422) of the second lubricating means (42) are located in the second substantially linear path portion (42) for ensuring a dry lubrication of respectively at least a substantially linear portion of the first guiding element (30) and a substantially linear portion of the second guiding element (40).

the second outlet open element (522) of the third lubricating means (52) and/or the second outlet open element (622) of the fourth lubricating means (62) is/are located in the second substantially linear path portion (6C) for ensuring a dry lubrication of respectively at least a substantially linear portion of the third guiding element (50) and at least a substantially linear portion of the fourth guiding element (60).

at least one guiding element selected from the group consisting of the first guiding element (30), the second guiding element (40), the third guiding element (50), and the fourth guiding element (60) before being at least partly curved or after development as an linear element has substantially the shape of a rod or tube provided with at least one portion with a substantially flat face.

at least one guiding element selected from the group consisting of the first guiding element (30), the second guiding element (40), the third guiding element (50), and the fourth guiding element (60) has substantially the shape of a rod or tube provided with a series of lateral openings placed along a helix or a kind of helix like line.

at least one guiding element selected from the group consisting of the first guiding element (30), the second guiding element (40), the third guiding element (50), and the fourth guiding element (60) is shaped so as to define at each moment of the twisting of a container, a linear contact zone between the outer surface of the container and the at at least one guiding element with a length of less than 0.5 cm (such as less than 2 mm, or even 1 mm), and a surface contact zone between the outer surface of the container and the at at least one guiding element of less than 5 mm$^2$ (such as less than 3 mm$^2$, 2 mm$^2$ or even less than 1 mm$^2$, the said surface being then preferably like a punctual contact surface) with a face system of the container moving along the one considered guiding element.

at least one guiding element selected from the group consisting of the first guiding element (30), the second guiding element (40), the third guiding element (50), and the fourth guiding element (60) comprises at least two elongated distinct element portions or parts, which are each shaped so as to define at each moment of the twisting of a container, a linear contact zone between the outer surface of the container and an elongated distinct guiding element of said at least one guiding element with a width or length of less than 0.5 cm (such as less than 2 mm, or even 1 mm), and a surface contact zone between the outer surface of the container and an elongated distinct guiding element of said at least one guiding element of less than 5 mm$^2$ (such as less than 3 mm$^2$, 2 mm$^2$ or even less than 1 mm$^2$, the said surface being then preferably like a punctual contact surface) with a face system (20) of the container (2) moving along the one considered guiding element.

the said at least one guiding element or each elongated element of the said at least one guiding element (30,40,50, 60) comprises at least one tube portion with a face provided with at least the first outlet open element (321,421,521,621) and/or the second outlet open element (322,422,522,622), the said tube portion being adapted for supplying lubricant from one or more lubricant supply or supplies (100,110,120, 130) to the said at least the first outlet open element (321,421,521,621) and/or the second outlet open element (322,422,522,622). The tube portion can be part of the supply connecting system or systems (366,466,566,666).

the said at least one guiding element or each elongated element of the said at least one guiding element comprises a tube element with a face provided with at least the first outlet open element (321,421,521,621) and the second outlet open element (322,422,522,622), the said tube portion being adapted for supplying lubricant from one or more lubricant supply or supplies (100,110,120,130) to the said at least the first outlet open element (321,421,521,621) and the second outlet open element (322,422,522,622). The tube portion can be part of the supply connecting system or systems (366, 466,566,666).

at least one guiding element selected from the group consisting of the first guiding element (30), the second guiding element (40), the third guiding element (50), and the fourth guiding element (60) is provided with a cooling system, said cooling system being advantageously in the form of a tube or channel adapted to be connected or associated to a coolant supply means (200).

at least one guiding element selected from the group consisting of the first guiding element (30), the second guiding element (40), the third guiding element (50), and the fourth guiding element (60) is provided or associated to a temperature sensor (901).

The device associated to a control system receiving one or more information or signals from one or more sensors, for controlling lubrication steps and/or for controlling a cooling step and/or for controlling a conveyor speed.

The device for moving containers following a central moving direction (MC) parallel to a central twisting axis, in which at least a gazeous lubricant under pressure is used as the fluid lubricant for at least a portion of a guiding face tube element selected from the group consisting of the first guiding face element, the second guiding face element, the third guiding face element and the fourth guiding face element, in which the said portion of the guiding face tube element (800) is provided with a series of injector openings (800,810) distant the one from the other by a distance of less than 5 cm, said injector openings being adapted for expelling the gazeous lubricant along a central direction (820A) having at least a direction composant parallel to the central moving direction (MC).

at least some injector openings (800,810) are adapted for directing (820A) a flow of gazeous lubricant in order to ease the twisting of containers.

any combinations of two or more than two of the above disclosed details or characteristics of advantageous embodiments.

The invention relates also to an conveyor for moving containers (2) along a moving path (3A), said conveyor comprising at least a device of the invention as disclosed hereabove.

In particular the conveyor of the invention is a conveyor for moving containers (2) along a moving path, said conveyor comprising at least a moving band (C1) directing containers (2) towards a twisting device (1) for twisting containers (2) while moving said containers along a moving path (3) in the twisting device, said moving path (3) comprising an at least partly curved path portion (3A) with an at least partly curved length path comprised between 30 cm and 500 cm for ensuring that each container (2) moving through the said at least partly curved path portion (3A) follows at least a curved movement, said containers (2) having at least an outer facing system (20), said at least partly curved path portion (3A) extending between an inlet (4) for the containers into the at least partly curved path portion (3A) and an outlet (5) for containers (2) after moving through the at least partly curved path portion (3A), whereby between said inlet (4) and outlet (5), the at least partly curved path portion (3A) comprises at least:

a support (10);

a first guiding element (30) attached to said support (10), said first guiding element (30) having at least a first guiding face element (31) adapted for contacting at least a first portion of an outer facing system (20) of the containers (2) moving in the at least partly curved path portion (3A);

a second guiding element (40) attached to said support (10), said second guiding element (40) having at least a second guiding face element (41) distant from the first guiding face element (31) and adapted for contacting at least a second portion of the outer facing system (20) of the containers (2) moving in the at least partly curved path portion (3A), said second portion of the outer facing system (20) of the containers being distinct from the first portion of the outer facing system (20) of the containers (2);

a first lubricating means (32) adapted for ensuring a dry lubrication of at least a portion of the first guiding element (30) by supplying a fluid lubricant selected from the group consisting of liquid lubricant, gazeous lubricant and mixtures thereof, along the first guiding face element (31), whereby the first lubricating means (32) has at least (a) a first outlet open element (321) along the the first guiding face element (31) with an outer open surface of less than 100 mm$^2$, (b) a second outlet open element (322) along the first guiding face element (31) with an outer open surface of less than 100 mm$^2$, said second outlet open element (322) being distant from the first outlet open element (321) by an at least partly curved path distance of at least 10 cm, and (c) a supply connecting system (366) connecting the first outlet open element (321) and the second outlet open element (322) to a connector (327) adapted to be connected to a first lubricant supply (100) for supplying said first outlet open element (321) and said second outlet open element (322) of the first lubricating means (32) with the fluid lubricant; and a second lubricating means (42) adapted for ensuring a dry lubrication of at least a portion of the second guiding element (40) by supplying the fluid lubricant along the second guiding face element (41), whereby the second lubricating means (42) has at least (a) a first outlet open element (421) along the the second guiding face element (41) with an open outer surface of less than 100 mm$^2$, (b) a second outlet open element (422) along the second guiding face element (41) with an open surface of less than 100 mm$^2$, said second outlet open element (422) of the second lubricating means (42) being distant from the first outlet open element (421) of the second lubricating means (42) by a at least partly curved path distance of at least 10 cm, and (c) a supply connecting system (466) connecting the first outlet open element (421) and the second outlet open element (422) of the second lubricating means (42) to a connector (427) adapted to be connected to a lubricant supply (100, 110) selected from the group consisting of the first lubricant supply and a second lubricant supply distinct from the first lubricant supply for supplying said first outlet open element (421) and said second outlet open element (422) of the second lubricating means (42) with the fluid lubricant.

Another object of the invention is the use of a twisting device according to the invention as disclosed here above, for ensuring a twisting of containers while moving along the twisting device.

In an embodiment of said use, the temperature of the at least one guiding element (30,40,50,60) is measured for controlling a cooling of at least one guiding element (30,40,50,60), and/or for controlling the supply of lubricant to the said at least one guiding element (30,40,50,60).

With the use of the invention, the invention relates also to a method for twisting containers (2) in a twisting device (1) (of the the invention) while moving said containers along a moving path (3) of the twisting device, said twisting device (1) comprising an at least partly curved path portion (3A) with an at least partly curved length path comprised between 30 cm and 500 cm for ensuring that each container (2) moving through the said at least partly curved path portion (3A) follows at least a curved movement, said containers (2) having at least an outer facing system (20), said at least partly curved path portion (3A) extending between an inlet (4) for the containers into the at least partly curved path portion (3A) and an outlet (5) for containers (2) after moving through the at least partly curved path portion (3A), whereby between said inlet (4) and outlet (5), the at least partly curved path portion (3A) comprises at least:

a support (10);

a first guiding element (30) attached to said support (10), said first guiding element (30) having at least a first guiding face element (31) adapted for contacting at least a first portion of an outer facing system (20) of the containers (2) moving in the at least partly curved path portion (3A);

a second guiding element (40) attached to said support (10), said second guiding element (40) having at least a second guiding face element (41) distant from the first guiding face element (31) and adapted for contacting at least a second portion of the outer facing system (20) of the containers (2) moving in the at least partly curved path portion (3A), said second portion of the outer facing system (20) of the containers being distinct from the first portion of the outer facing system (20) of the containers (2);

a first lubricating means (32) adapted for ensuring a dry lubrication of at least a portion of the first guiding element (30) by supplying a fluid lubricant selected from the group consisting of liquid lubricant, gazeous lubricant and mixtures thereof, along the first guiding face element (31), whereby the first lubricating means (32) has at least (a) a first outlet open element (321) along the the first guiding face element (31) with an outer open surface of less than 100 mm$^2$, (b) a second outlet open element (322) along the first guiding face element (31) with an outer open surface of less than 100 mm$^2$, said second outlet open element (322) being distant from the first outlet open element (321) by an at least partly curved path distance of at least 10 cm, and (c) a supply connecting system (366) connecting the first outlet open element (321) and the second outlet open element (322) to a connector (327) adapted to be connected to a first lubricant supply (100) for supplying said first outlet open element (321) and said second outlet open element (322) of the first lubricating means (32) with the fluid lubricant; and a second lubricating means (42) adapted for ensuring a dry lubrication of at least a portion of the second guiding element (40) by supplying the fluid lubricant along the second guiding face element (41), whereby the second lubricating means (42) has at least (a) a first outlet open element (421) along the the second guiding face element (41) with an open outer surface of less than 100 mm$^2$, (b) a second outlet open element (422) along the second guiding face element (41) with an open surface of less than 100 mm², said second outlet open element (422) of the second lubricating means (42) being distant from the first outlet open element (421) of the second lubricating means (42) by a at least partly curved path distance of at least 10 cm, and (c) a supply connecting system (466) connecting the first outlet open element (421) and the second outlet open element (422) of the second lubricating means (42) to a connector (427) adapted to be connected to a lubricant supply (100, 110) selected from the group consisting of the first lubricant supply and a second lubricant supply distinct from the first lubricant supply for supplying said first outlet open element (421) and said second outlet open element (422) of the second lubricating means (42) with the fluid lubricant, said method comprising at least the following steps:
determining a parameter associated to the twisting of containers in in the twisting device (1),
determining whether said determined parameter is not within an acceptable range or is outside an acceptable range (such as above a maximum authorized parameter or friction parameter and/or such as less than a minimum authorized parameter or friction value), so as to determine a required lubrication step of at least a portion of the first guiding means and of a portion of the second guiding means, and
controlling the supply of fluid lubricant to the first lubricating means and to the second lubricating means when a required lubrication step is determined.

Advantageously, the method of the invention further comprises the step of determining a parameter function of the temperature of at least one guiding element (30,40,50,60) of the twisting device (1) for determining at least the requirement of a cooling step when the determined parameter is not within an acceptable range or is outside an acceptable range, and the step of cooling at least a portion of the twisting device when the requirement of a cooling step is determined.

In the method of the invention, the speed of the band C1 can also be controlled in function of one or more working parameters of the twisting devices. For example, in case of excessive heating of the one or more guiding elements of the twisting device due to friction of containers (2) along the one or more guiding elements, the speed of the band C1 will be reduced, so as to enable for example an easier cooling of the twisting device or portion thereof. When using gazeous fluid lubricant, such as air, said air can also act as means for ensuring a cooling of the twisting.

Details of the invention will now be disclosed with reference to the attached drawings of preferred embodiments of the invention given as example only.

BRIEF DESCRIPTION OF THE DRAWINGS

In said drawings:
FIG. 1 is a side view of a twisting device of the invention comprising eight at least partly curved elongated elements;
FIG. 2 is a view of a bottle to be twisted in the twisting device of FIG. 1, while FIG. 2A is a view of a can to be twisted in a device similar to the device of FIG. 1;
FIGS. 3 to 7 are cross section views of the device of FIG. 1 respectively along the lines IV-IV, V-V, VI-VI and VII-VII;
FIGS. 8 and 9 are cross section views of FIG. 3 respectively along the lines VIII-VIII and IX-IX;
FIGS. 10 and 11 are cross section views of FIG. 4 respectively along the lines X-X and XI-XI;

FIGS. 12 and 13 are cross section views of FIG. 5 respectively along the lines XII-XII and XIII-XIII;
FIG. 17 is a general view of a twisting device shaped as a box;
FIG. 18 is view of a tube portion 800, before being torsaded, for forming a guiding element of a twisting device of the invention, said tube portion being adapted for a gazeous lubricant,
and
FIG. 19 is a cross-section view of the tube portion 800 of FIG. 18, along the lines XIX-XIX.

DESCRIPTION OF PREFERRED EMBODIMENTS

Figure 14:
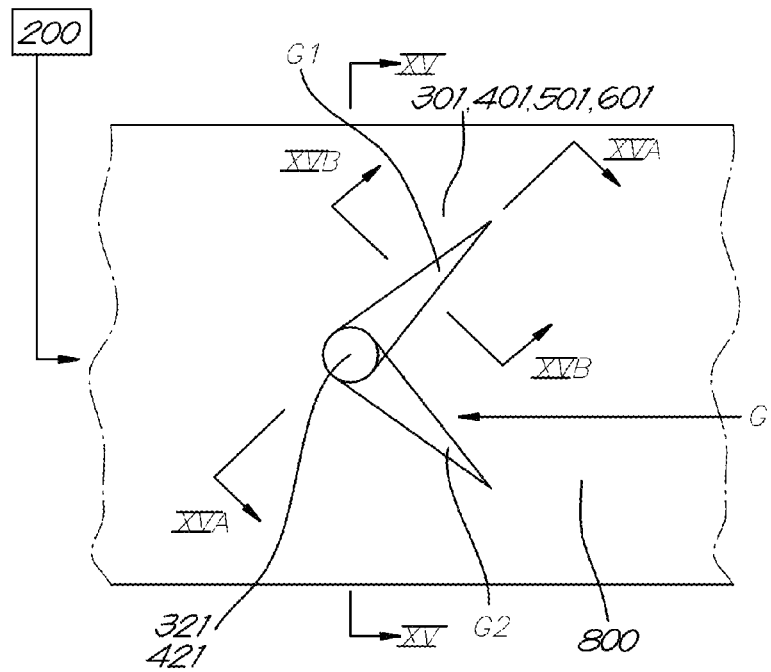
FIG. 14 is an enlarged view of a face portion of a guiding element contacting a face of the bottle or container.

The following description is given as examples only of preferred embodiments.

The device of FIG. 1 is a device (1) for twisting containers (2) while moving said containers along a moving path (3) comprising an at least partly curved path portion (3A) with an at least partly curved length path L comprised between 30 cm and 500 cm, such as between 50 cm and 300 cm for ensuring that each container (2) moving through the said at least partly curved path portion follows at least a curved movement or a twisting movement.

The containers to be twisted (for example movement of rotation of about +90° (vertical position towards a horizontal position) followed by a movement of rotation of −90° (horizontal position back to the initial vertical position) have each a cylindric face (203), said containers (2) having at least an outer facing system (20), said at least partly curved path portion (3A) extending between an inlet (4) of containers into the at least partly curved path portion (3A) and an outlet (5) of containers (2) from the at least partly curved path portion (3A). MC designated the flow direction of the containers through the twisting device.

The containers to be moved shown as example in FIG. 2 (like a bottle) has an outer facing system 20 consisting of a cylindrical lateral body face 203, a bottom face 201, a top face system 202 (comprising the shoulder portion, the neck portion and the upper ring, as well as the closure element). The containers are for example filled with a liquid to be shaked or have to twisted for checking the correct closure of the containers. The containers can also be a can as shown in perspective in FIG. 2A, the bottom face 201 is similar to the top face 202, except that there is no tearing opening system 205 along the bottom face. The bottom face 201 and the top face 202 are each provided with a circular rounded edge 206,207, adapted to contact one or more guiding rods during the twisting movement.

In the device of the invention, between said inlet (4) and outlet (5), the at least partly curved path portion (3A) comprises at least:
a support (10);
five lubricating stations 90,91,92,93,94 distant the one from the other (in the embodiment shown, lubricating station 90 is equivalent to lubricating station 94, while lubricating station 91 is equivalent to lubricating station 93), and a series of guiding elements (30,40,50,60—see FIG. 3) for guiding the bottles during their movement from the inlet lubricating station 90 towards the outlet lubricating station 94, the inlet station receiving bottles from a conveyor C1, while an outlet conveyor C2 collect the containers 2 after being twisted.

The lubricating stations can be shaped as independent similar body to be connected then the one to another by curved elements. The support 10 is then provided with supporting element for ensuring the required angular position of each lubrication stations (90-94). In the device of FIG. 1, a liquid lubricant is used.

Figure 15:
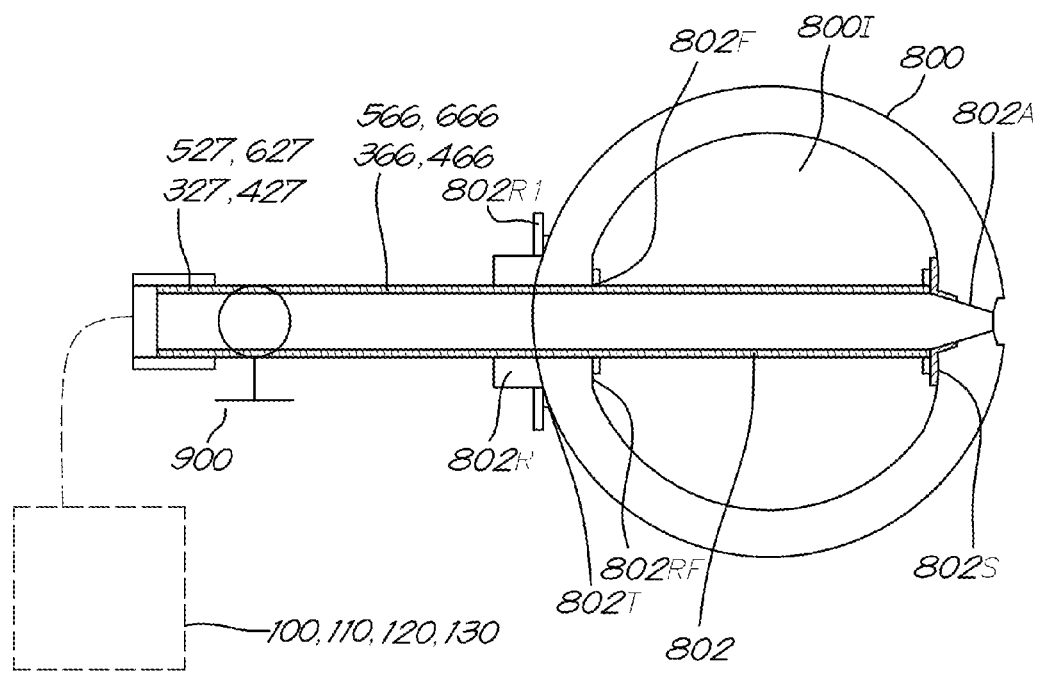
FIG. 15 is an enlarged cross section view of a portion (800) of the guiding element at a location of an outlet open element (line XV-XV)

The series of guiding elements comprises:

a first guiding element (30) attached to said support (10), said first guiding element (30) having two elongated tubes 301,302 having each a first guiding face element (31) adapted for contacting at least a first portion of the lateral face 203 of the container 2 moving in the at least partly curved path portion (3A) (each elongated tube 301,302 has a substantially continuous at least partly curved contact area or band with the lateral face 203 of the container during its movement from the inlet 4 to the outlet 5, said contact area or band having a width of less than 0.5 cm, advantageously less than 0.2 mm, preferably less than 0.1 mm. The contact area of the container on the each elongated tube at each moment of the twisting is less than 5 mm$^2$, advantageously less than 2 mm$^2$);

a second guiding element (40) attached to said support (10), said second guiding element (40) having two elongated tube 401,402 having each a second guiding face element (41) distant from the first guiding face element (31) and adapted for contacting at least a second portion of the outer lateral face 203 of the container (2) moving in the at least partly curved path portion (3A), said second portion of the outer lateral face 203 of the container being different from the first portion of the outer lateral face 203 of the container (2) when contacting the first guiding element (each elongated tube 401,402 has a substantially continuous at least partly curved contact area or band with the lateral face 203 of the container during its movement from the inlet 4 to the outlet 5, said contact area or band having a width of less than 0.5 cm, advantageously less than 0.2 mm, preferably less than 0.1 mm. The contact area of the container on the each elongated tube at each moment of the twisting is less than 5 mm$^2$, advantageously less than 2 mm$^2$);

a third guiding element (50) attached to said support (10), said third guiding element (50) having two elongated tubes 501,502 distant the one from the other, each of said tube 501,502 having a third guiding face element (51) adapted for contacting at least a portion of the bottom face (201) of the container (2) moving in the at least partly curved path portion (3A) (each elongated tube 501,502 has a substantially continuous at least partly curved contact area or band with the bottom face 201 of the container during its movement from the inlet 4 to the outlet 5, said contact area or band having a width of less than 0.5 cm, advantageously less than 0.2 mm, preferably less than 0.1 mm. The contact area of the container on the each elongated tube at each moment of the twisting is less than 5 mm$^2$, advantageously less than 2 mm$^2$);

a fourth guiding element (60) attached to said support (10), said fourth guiding element (60) having two distinct elongated tube 601,602 having each a fourth guiding face element (61) adapted for contacting at least a second portion of the top face or neck or shoulder portion (202) of the container (2) moving in the at least partly curved path portion (3A) (each elongated tube 601,602 has a substantially continuous at least partly curved contact area or band with the top face or neck or shoulder portion 202 of the container during its movement from the inlet 4 to the outlet 5, said contact area or band having a width of less than 0.5 cm, advantageously less than 0.2 mm, preferably less than 0.1 mm. The contact area of the container on the each elongated tube at each moment of the twisting is less than 5 mm$^2$, advantageously less than 2 mm$^2$);

a first lubricating means (32) adapted for ensuring a dry lubrication of at least a portion of the elongated tubes 301,302 of the first guiding element (30) by supplying the fluid lubricant along the first guiding face element (31), whereby for each elongated tubes 301,302, the first lubricating means (32) has at least (a) at the first lubrication inlet station (90), a first outlet open element (321) along the the first guiding face element (31) with an open outer surface of less than 100 mm$^2$ (such as less than 75 mm$^2$, less than 50 mm$^2$, less than 25 mm$^2$, such as less 15 mm$^2$, preferably less than 10 mm$^2$ or even more preferably equal or less than 5 mm$^2$), (b) at the second lubrication station 91, a second outlet open element (322) along the first guiding face element (31) with an open surface of less than 100 mm$^2$ (such as less than 75 mm$^2$, less than 50 mm$^2$, less than 25 mm$^2$, such as less 15 mm$^2$, preferably less than 10 mm$^2$ or even more preferably equal or less than 5 mm$^2$), said second outlet open element (322) being distant from the first outlet open element (321) by an at least partly curved path distance (L1) of at least 20 cm, (c) at the third lubrication station 92, a third outlet open element (323) along the first guiding face element (31) with an open surface of less than 100 mm$^2$ (such as less than 75 mm$^2$, less than 50 mm$^2$, less than 25 mm$^2$, such as less 15 mm$^2$, preferably less than 10 mm$^2$ or even more preferably equal or less than 5 mm$^2$), said third outlet open element (323) being distant from the second outlet open element (322) by an at least partly curved path distance of at least 10 cm (advantageously at least 20 cm), (d) at the fourth lubrication station 93, a fourth outlet open element (324) along the first guiding face element (31) with an open surface of less than 100 mm$^2$ (such as less than 75 mm$^2$, less than 50 mm$^2$, less than 25 mm$^2$, such as less 15 mm$^2$, preferably less than 10 mm$^2$ or even more preferably equal or less than 5 mm$^2$), said fourth outlet open element (324) being distant from the third outlet open element (323) by an at least partly curved path distance of at least 10 cm (advantageously at least 20 cm), (e) at the fifth lubrication station 94 (outlet station), a fifth outlet open element (325) along the first guiding face element (31) with an open surface of less than 100 mm$^2$ (such as less than 75 mm$^2$, less than 50 mm$^2$, less than 25 mm$^2$, such as less 15 mm$^2$, preferably less than 10 mm$^2$ or even more preferably equal or less than 5 mm$^2$), said fifth outlet open element (325) being distant from the fourth outlet open element (324) by an at least partly curved path distance of at least 10 cm (advantageously at least 20 cm), and (f) a supply connecting system (366) connecting each of the first outlet open element (321), the second outlet open element (322), the third outlet open element, the fourth outlet open element, and the fifth outlet open element 325 of each elongated tube 301,302 to a connector (327) (see FIG. 15 showing one outlet connected to the connecting system 366) adapted to be connected to a lubricant supply (100) for supplying said first outlet open element (321), said second outlet open element (322), said third outlet open element (323), said fourth outlet open element (324) and said fifth outlet open element (325) of the first lubricating means (32) with the fluid lubricant (when required, microdoses of liquid lubricant);

a second lubricating means (42) adapted for ensuring a dry lubrication of at least a portion of the elongated tubes 401,402 of the second guiding element (40) by supplying the fluid lubricant along the second guiding face element (41), whereby for each elongated tubes 401,402, the second lubricating means (32) has at least (a) at the first lubrication inlet station (90), a first outlet open element (421) along the the second guiding face element (41) with an open outer surface of less than 100 mm² (such as less than 75 mm², less than 50 mm², less than 25 mm², such as less 15 mm², preferably less than 10 mm² or even more preferably equal or less than 5 mm²), (b) at the second lubrication station 91, a second outlet open element (422) along the second guiding face element (41) with an open surface of less than 100 mm² (such as less than 75 mm², less than 50 mm², less than 25 mm², such as less 15 mm², preferably less than 10 mm² or even more preferably equal or less than 5 mm²), said second outlet open element (422) being distant from the first outlet open element (421) by an at least partly curved path distance of at least 10 cm, (c) at the third lubrication station 92, a third outlet open element (423) along the second guiding face element (41) with an open surface of less than 100 mm² (such as less than 75 mm², less than 50 mm², less than 25 mm², such as less 15 mm², preferably less than 10 mm² or even more preferably equal or less than 5 mm²), said third outlet open element (423) being distant from the second outlet open element (422) by an at least partly curved path distance of at least 10 cm, (d) at the fourth lubrication station 93, a fourth outlet open element (424) along the second guiding face element (41) with an open surface of less than 100 mm² (such as less than 75 mm², less than 50 mm², less than 25 mm², such as less 15 mm², preferably less than 10 mm² or even more preferably equal or less than 5 mm²), said fourth outlet open element (424) being distant from the third outlet open element (423) by an at least partly curved path distance of at least 10 cm, (e) at the fifth lubrication station 94 (outlet station), a fifth outlet open element (425) along the second guiding face element (41) with an open surface of less than 100 mm² (such as less than 75 mm², less than 50 mm², less than 25 mm², such as less 15 mm², preferably less than 10 mm² or even more preferably equal or less than 5 mm²), said fifth outlet open element (425) being distant from the fourth outlet open element (424) by an at least partly curved path distance of at least 10 cm, and (f) a supply connecting system (466) connecting each of the first outlet open element (421), the second outlet open element (422), the third outlet open element, the fourth outlet open element and fifth outlet open element 425 of each elongated tube 401,402 to a connector (427) (see FIG. 15) adapted to be connected to a lubricant supply (100,110) for supplying said first outlet open element (421), said second outlet open element (422), said third outlet open element (423), said fourth outlet open element (424) and said fifth outlet open element (425) of the third lubricating means (42) with the fluid lubricant (when required);

a third lubricating means (52) adapted for ensuring a dry lubrication of at least a portion of the elongated tubes 501,502 of the third guiding element (50) by supplying the fluid lubricant along the second guiding face element (51), whereby for each elongated tubes 501,502, the second lubricating means (52) has at least (a) at the first lubrication inlet station (90), a first outlet open element (521) along the the third guiding face element (51) with an open outer surface of less than 100 mm² (such as less than 75 mm², less than 50 mm², less than 25 mm², such as less 15 mm², preferably less than 10 mm² or even more preferably equal or less than 5 mm²), (b) at the second lubrication station 91, a second outlet open element (522) along the third guiding face element (51) with an open surface of less than 100 mm² (such as less than 75 mm², less than 50 mm², less than 25 mm², such as less 15 mm², preferably less than 10 mm² or even more preferably equal or less than 5 mm²), said second outlet open element (522) being distant from the first outlet open element (521) by an at least partly curved path distance of at least 10 cm, (c) at the third lubrication station 92, a third outlet open element (523) along the third guiding face element (51) with an open surface of less than 100 mm² (such as less than 75 mm², less than 50 mm², less than 25 mm², such as less 15 mm², preferably less than 10 mm² or even more preferably equal or less than 5 mm²), said third outlet open element (523) being distant from the second outlet open element (522) by an at least partly curved path distance of at least 10 cm, (d) at the fourth lubrication station 93, a fourth outlet open element (524) along the third guiding face element (41) with an open surface of less than 100 mm² (such as less than 75 mm², less than 50 mm², less than 25 mm², such as less 15 mm², preferably less than 10 mm² or even more preferably equal or less than 5 mm²), said fourth outlet open element (524) being distant from the third outlet open element (523) by an at least partly curved path distance of at least 10 cm, (e) at the fifth lubrication station 94 (outlet station), a fifth outlet open element (525) along the third guiding face element (51) with an open surface of less than 100 mm² (such as less than 75 mm², less than 50 mm², less than 25 mm², such as less 15 mm², preferably less than 10 mm² or even more preferably equal or less than 5 mm²), said fifth outlet open element (525) being distant from the fourth outlet open element (524) by an at least partly curved path distance of at least 10 cm, and (f) a supply connecting system (566) connecting each of the first outlet open element (521), the second outlet open element (522), the third outlet open element (523), the fourth outlet open element (524) and fifth outlet open element 525 of each elongated tube 501,502 to a connector (527) (see FIG. 15) adapted to be connected to a lubricant supply (100,110,120) for supplying said first outlet open element (521), said second outlet open element (522), said third outlet open element (523), said fourth outlet open element (524) and said fifth outlet open element (525) of each elongated tube (501,502) of the third lubricating means (52) with the fluid lubricant (when required);

a fourth lubricating means (62) adapted for ensuring a dry lubrication of at least a portion of the elongated tubes 601,602 of the fourth guiding element (60) by supplying the fluid lubricant along the fourth guiding face element (61), whereby for each elongated tubes 601,602, the fourth lubricating means (62) has at least (a) at the first lubrication inlet station (90), a first outlet open element (621) along the the fourth guiding face element (61) with an open outer surface of less than 100 mm² (such as less than 75 mm², less than 50 mm², less than 25 mm², such as less 15 mm², preferably less than 10 mm² or even more preferably equal or less than 5 mm²), (b) at the second lubrication station 91, a second outlet open element (622) along the fourth guiding face element (61) with an open surface of less than 100 mm² (such as less than 75 mm², less than 50 mm², less than 25 mm², such as less 15 mm², preferably less than 10 mm² or even more preferably equal or less than 5 mm²), said second outlet open element (622) being distant from the first outlet open element (621) by an at least partly curved path distance of at least 10 cm, (c) at the third lubrication station 92, a third outlet open element (623) along the fourth guiding face element (61) with an open surface of less than 100 mm² (such as less than 75 mm², less than 50 mm², less than 25 mm², such as less 15 mm², preferably less than 10 mm² or even more preferably equal or less than 5 mm$^2$), said third outlet open element (623) being distant from the second outlet open element (622) by an at least partly curved path distance of at least 10 cm, (d) at the fourth lubrication station 93, a fourth outlet open element (624) along the fourth guiding face element (61) with an open surface of less than 100 mm$^2$ (such as less than 75 mm$^2$, less than 50 mm$^2$, less than 25 mm$^2$, such as less 15 mm$^2$, preferably less than 10 mm$^2$ or even more preferably equal or less than 5 mm$^2$), said fourth outlet open element (624) being distant from the third outlet open element (623) by an at least partly curved path distance of at least 10 cm, (e) at the fifth lubrication station 94 (outlet station), a fifth outlet open element (625) along the fourth guiding face element (61) with an open surface of less than 100 mm$^2$ (such as less than 75 mm$^2$, less than 50 mm$^2$, less than 25 mm$^2$, such as less 15 mm$^2$, preferably less than 10 mm$^2$ or even more preferably equal or less than 5 mm$^2$), said fifth outlet open element (625) being distant from the fourth outlet open element (624) by an at least partly curved path distance of at least 10 cm, and (f) a supply connecting system (666) connecting each of the first outlet open element (621), the second outlet open element (622), the third outlet open element (623), the fourth outlet open element (624) and fifth outlet open element 625 of each elongated tube 601,602 to a connector (627) (see FIG. 15) adapted to be connected to a lubricant supply (100,110,120,130,140) for supplying said first outlet open element (621), said second outlet open element (622), said third outlet open element (623), said fourth outlet open element (624) and said fifth outlet open element (625) of each elongated tube 601,602 of the fourth lubricating means (62) with the fluid lubricant (when required).

The lubricant is supplied to the outlet open elements at very low rate, such as per outlet open element, for example from 50 to 200 mm$^3$ of lubricant per hour. Possible lubricant is for example DLT-333, a food grade white mineral oil with PTFE and wax. The liquid lubricant is preferably substantially water free, and has a low viscosity at 20° C. The liquid lubricant is advantageously supplied step by step, for example microdoses of lubricant are supplied at specific moments, while stopping the supply of liquid lubricant between two successive supply steps of lubricant, When supplying lubricant to the outlet open elements, the outlet open elements are advantageously located along a face portion directed at least partly upwardly, preferably only upwardly, or at least partly vertically or substantially vertically, so as to prevent as much as possible gravity flow of lubricant from the outlet open elements. For example, in lubricant station 91, 92 and 93 no lubricant or a reduced quantity of lubricant is supplied to the outlet open elements of elongated tubes 401,402 and 602 for preventing a gravity flow.

FIG. 14 shows an outlet open element (such 321,421,521, 621, etc. for tube portion 800 of guiding rod 301,401,501, 601) extending along a substantially curved face portion 800 whereby ensuring a substantially punctual contact surface with the lateral face 203 of the can or bottle of FIG. 2 or 2A. The outlet open element is associated to groove system G along said curved face 800. The guiding element portion 800 is for example a portion of a tube with a wall thickness of about 2 mm, said tube 800 having for example an outer diameter of 10 to 16 mm. The tube is for example heat torsaded for giving the required curvature. The groove G is shaped with two parts G1,G2 (with rounded ends) formed partly in the thickness of the elongated tube 301,401, etc. For example the depth of the groove parts G1,G2 is of 0.5 to 1 mm (with respect to a thickness of the tube wall of about 2 mm) The groove parts G1,G2 forms extensions with respect to the central opening connected to the connector 327, 427, etc. intended to be connected to a lubricant supply 100, 110, 120, etc. The groove parts G1,G2 have each a length of about 10 mm and an average width of about 2 mm, meaning an open surface (at the level of the outer face of the tube) for the outlet open element of about 40 to 50 mm$^2$. The edges of the groove along the curved face of the tube are rounded so as to avoid that the edge of the grooves can damage the lateral face of the cans or bottles while twisting.

The grooves G1,G2 form a reservoir for the liquid lubricant and are quite useful for ensuring a lubrication along a curved path portion of the tube guiding element 301,302, 401, etc.

As shown in FIG. 15, the twisting tube 301,401, etc. is provided with a hole 801 for enabling the insertion of a connecting tube 802 into the inner chamber of the twisting tube 301,401, etc., so as to form a connection with the outlet open element 321, 421, etc. along the curved face portion 800 of the twisting tube. The lubricant supply tube 802 inserted into the twisting tube portion is associated to sealing means 802S and 802T. The supply tube 802 is attached to the screwed hole 801 of the twisting tube portion 800 by means of a ring 802R provided with a flange 802R1. The ring 802R has an end face 802RE contacting a flange 802F. The ring 802R is provided with a screw lateral face adapted to screwed into the screwed hole 801. By the screwing of the ring 802R, the lubricant supply tube 802 is moved towards the outlet 321,421, etc. as the ring 802R is abutting against the flange 802F. Due to said movement, the sealing members 802S and 802T are compressed, ensuring correct sealing.

The supply tube 802 is part of the supply connecting system (366,466, etc.) provided with the connector 327,427, etc. adapted for connection to a lubricant supply.

The tube 802 is associated to a valve 900 with control mechanism, adapted to control the supply of lubricant in function of instructions from the central control system 1000.

As the sealing of the inner volume 8001 of the twisting tube 800 with respect to the lubricant supply tube 802 and the outside is ensured, the twisting tube 800 and its inner volume can be used for the flow of a coolant medium or fluid from a coolant supply means 200 (as any leaking of possible liquid cooling medium flowing within the inner volume of the twisting tube is prevented). The flowing of liquid coolant within the tube is interesting for reducing the heating of the tube due to the contact thereof with the moving containers, as well for ensuring the lubricant not to be overheated or to be be undercooled.

The supply connecting system 366, 466, etc. is also provided with an independent valve system 900 which can be controlled for supplying a determined quantity of lubricant at different moments, such as once or twice distinct moments per hour.

The end of the lubricant supply tube 802 is provided with a injector head 802A with a central opening with a diameter of about 1 mm, so as to control the flow of the liquid lubricant within the grooves G1, G2.

Figure 15A:
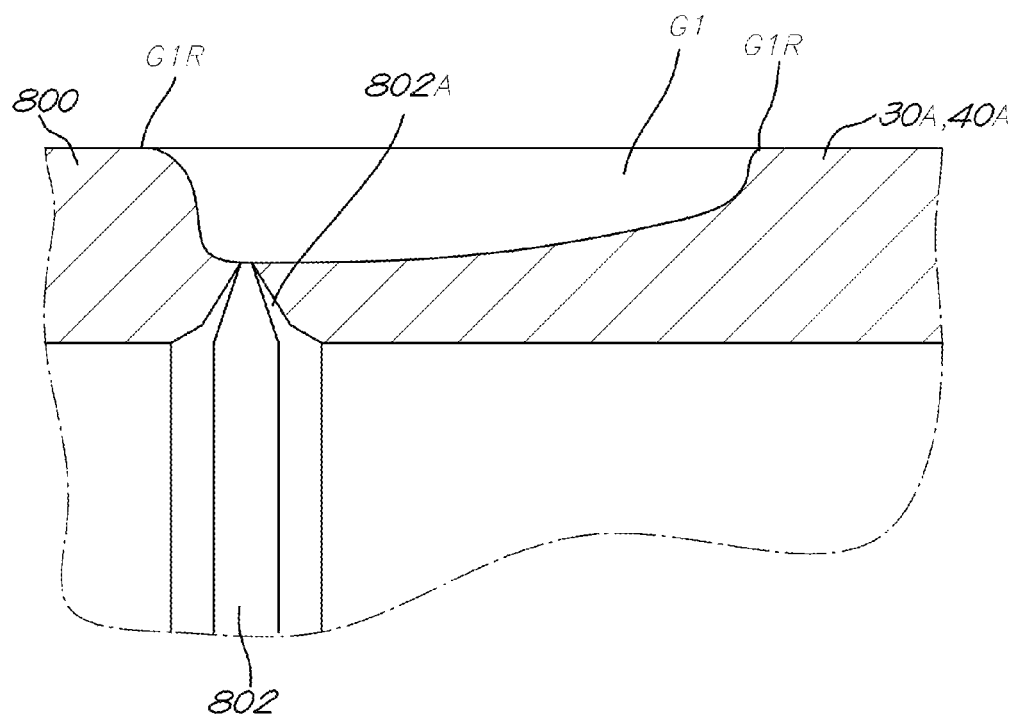
FIGS. 15A and 15B are cross section views of the tube portion 800 of FIG. 14 respectively along the line XVA-XVA, and XVB-XVB.
Figure 15B:
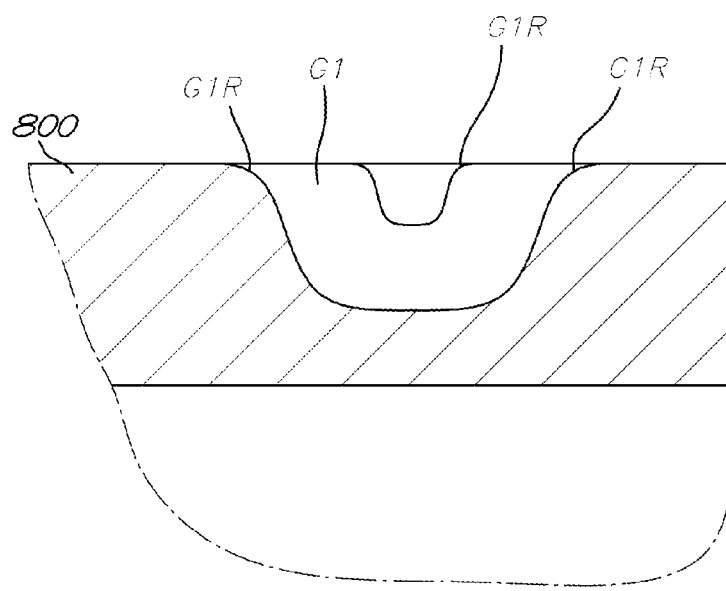

FIGS. 15A and 15B are cross section views of the tube portion 800 of FIG. 15 respectively along the line XVA-XVA, and the line XVB-XVB.

As it can be seen, the depth of the groove G1 (also G2) decreases from a maximum depth at the injector head 802A, while the outer edges G1R of the groove G1 are rounded. G2 is similar to G1.

At the different lubrication stations, the tube portions can be rectilinear or not.

The straight portions of the the tube in lubrication stations ensure that at least at the various lubrication stations, a portion of the lateral face, the bottom face and/or top face of the moving container or can contacts the curved outer face of the tube along different small linear zones or punctual like surfaces of the containers or cans. The application of some lubricant on the said contact zone of the container will ensure some deposit of liquid lubricant on the tube portion extending between two lubricant stations, for example located at a distance of 30 to 50 cm the one from another.

In the embodiment of FIG. 1, the lubricant stations are adapted so that at the place of the lubrication stations 90,91,92,93,94, the movement of the moving containers is substantially free of any pivotment, i.e. a substantially linear movement so as to ease a control of a good lubrication of a portion of small portions of containers, whereby said lubricated portions of the lubricated containers will lubricated the curved tube portions between the lubrication stations. The lubrication stations define then substantially linear path portions (with a length of less than 5 cm, for example) (3B), (3C), with inbetween curved path section 3D.

The elongated tube can also been shaped so as to ensure at least a contact line between the tube and the moving container along all the moving path. For example, before being partly curved, the elongated tube can be shaped so as to develop an outer substantially longitudinal curved face or an outer face following a thread, said thread when curved ensuring a substantially punctual contact with the cylindrical face of the containers or cans. In case the container is a box, the contact area will be a surface.

Instead of using a tube, it is also possible to use a rod. However, when using a rod, it is not possible to use the elongated tube for cooling the twisting device.

When using elongated tubes 301, 401, etc., it is possible to connect said tube to a cooling system 200, for enabling the flow of a cooling medium in the said tubes. For having a control of said cooling, as well as for determining when time to time lubrication steps have to be operated at one or more outlet open elements of one or more lubrication stations, the twisting device is provided with temperature sensors 901, for example for determining at each of the lubrication stations the temperature for each tube portions in the lubrication station considered.

The central control System 1000 receives signals from the different temperature sensors 901, as well information about the flow rate of containers to be twisted per hours or minutes. In order to keep the temperature of the tubes within an acceptable range, the control system determines the flow of cooling liquid to flow within each tube. A signal is then sent to the cooling control system for supplying cooling liquid to each tube.

Figure 16:
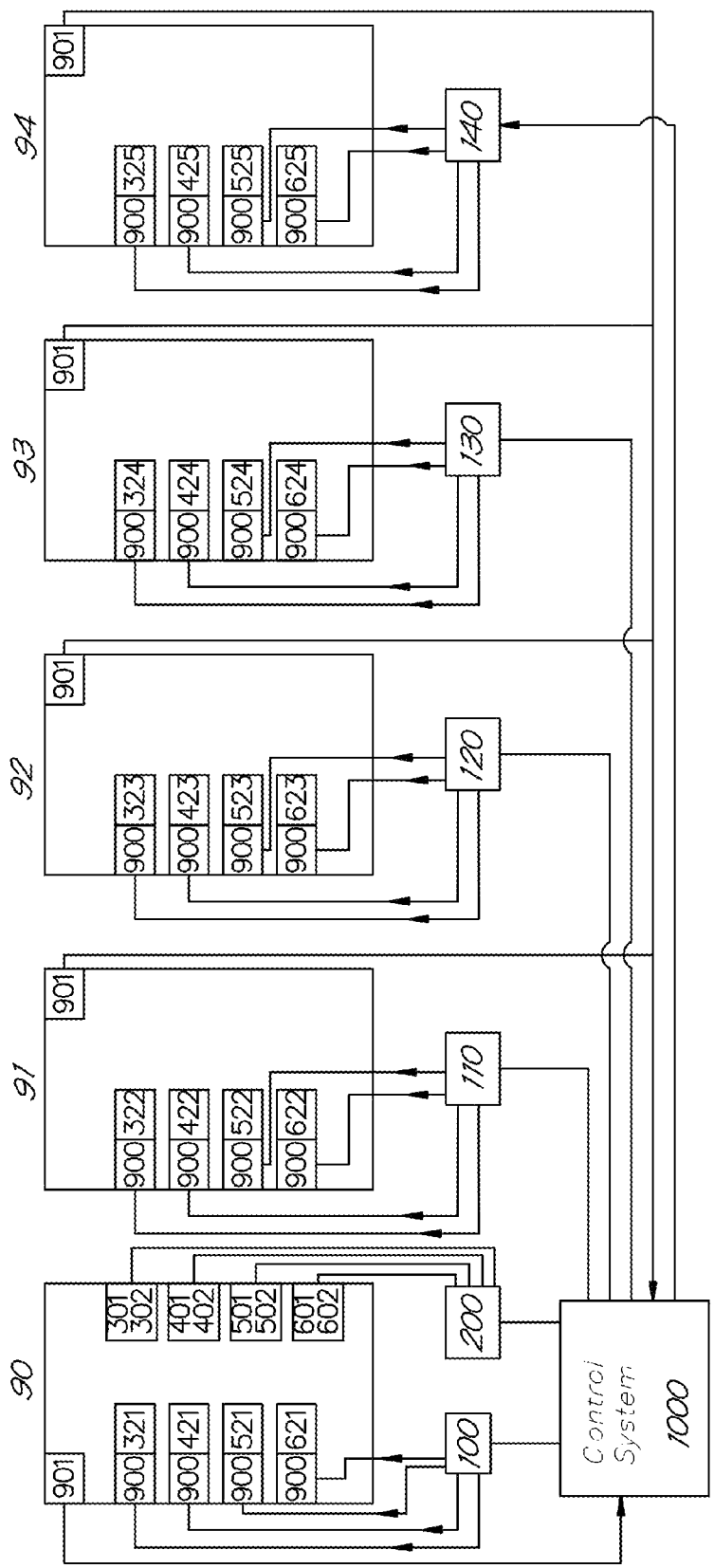
FIG. 16 is a schematic control chart of the circuit of lubricant for the twisting device of FIG. 1.

When the temperature of a tube is above a specific range, or when the flow of twisted container is below a specific range, the control system 1000 determines the implementation of one or more lubrication steps, said lubrication steps being operated by supplying intermittently microdose of lubricant to one or more outlet open elements. The control system controls the opening and closing of the control valve for each outlet open element, whereby enabling different lubrication steps or non lubrication step for one or more outlet open elements, and this independently the one from the other. (see FIG. 16)

FIG. 17 is a twisting device 1 shaped as a box, which can be printed in 3D, so that the inner contacting faces of the box forming the twisting channel 3 is provided with a series of outlet open elements for supplying lubricant to one or more of said faces. The outlet open elements are connected to inner piping system formed during the 3D printing. The ends 1010 of said series of piping systems can then be connected to distinct lubricant supply pipes or to a central supply control system, so as to enable independent lubricant supply to each outlet open element. The box 1 is also advantageously provided with one or more inner channels 1020 to be connected to a cooling system, for ensuring the cooling of the box, and the inner faces of the channel in contact with the containers to be twisted.

FIG. 18 is view of a twisting tube portion 800, before being torsaded for being able to generate a twisting movement, for forming a guiding element of a twisting device of the invention. The tube 800 is thus represented as linear in FIG. 18.

FIG. 19 is a cross-section view of the tube portion 800 of FIG. 18, along the lines XIX-XIX.

The tube portion 800 of FIG. 18 is indended to be connected to an air supply (compressed air, with an air pressure within the tube of about $3 \times 10^5$ Pa upto $10 \times 10^5$ Pa).

Air is supplied within the tube (inner volume 8001) substantially in a continuous way, so as to generate various different air flows along the whole length of the tube.

The tube 800 is provided with a series of outlet openings 810 for the escape of air from the tube. The outer diameter of openings is for example equal to or less than 1 mm. The outlet openings are spaced the one from the other by an axial distance (d) of about 2 cm, substantially along all the length of the tube 800 (length of 100 to 200 cm, for example).

The outer outlet openings 810 are the ends of holes 820 in the thickness of the tube 800, said holes 820 having each a frustoconical like shape with a central axis 820A forming an angle with the axial direction 800A of the tube 800. As it can be seen the outlet openings 810 are located along a substantially straight line, which will become a helix like path after being torsaded.

By adapting the diameter of the outlet openings 810 and the angular position of the central axis 820A with respect to the axial direction (800A) of the tube 800, it is possible after torsading the tube 800 for forming a at least partly curved guiding element, to direct the successive air flows towards a face of the moving containers or cans, so as push the containers and cans in their general movement direction and in their general twisting direction. The successive air impulses on the surface of the cans or containers are further helping the movement of the cans and containers within the twisting device.

The invention relates also to a lubrication station as disclosed here above for a twisting device of the invention or for a existing twisting device.

The invention claimed is:

1. A device (1) for twisting containers (2) while moving said containers along a moving path (3) comprising an at least partly curved path portion (3A) with an at least partly curved length path comprised between 30 cm and 500 cm for ensuring that each container (2) moving through the said at least partly curved path portion (3A) follows at least a curved movement, said containers (2) having at least an outer facing system (20), said at least partly curved path portion (3A) extending between an inlet (4) for the containers into the at least partly curved path portion (3A) and an outlet (5) for containers (2) after moving through the at least partly curved path portion (3A), whereby between said inlet (4) and outlet (5), the at least partly curved path portion (3A) comprises at least:

a support (10);
a first guiding element (30) attached to said support (10), said first guiding element (30) having at least a first guiding face element (31) adapted for contacting at least a first portion of an outer facing system (20) of the containers (2) moving in the at least partly curved path portion (3A);

a second guiding element (40) attached to said support (10), said second guiding element (40) having at least a second guiding face element (41) distant from the first guiding face element (31) and adapted for contacting at least a second portion of the outer facing system (20) of the containers (2) moving in the at least partly curved path portion (3A), said second portion of the outer facing system (20) of the containers being distinct from the first portion of the outer facing system (20) of the containers (2);

a first lubricating means (32) adapted for ensuring a dry lubrication of at least a portion of the first guiding element (30) by supplying a fluid lubricant selected from the group consisting of liquid lubricant, gazeous lubricant and mixtures thereof, along the first guiding face element (31), whereby the first lubricating means (32) has at least (a) a first outlet open element (321) along the the first guiding face element (31) with an outer open surface of less than 100 mm$^2$, (b) a second outlet open element (322) along the first guiding face element (31) with an outer open surface of less than 100 mm$^2$, said second outlet open element (322) being distant from the first outlet open element (321) by an at least partly curved path distance of at least 10 cm, and (c) a supply connecting system (366) connecting the first outlet open element (321) and the second outlet open element (322) to a connector (327) adapted to be connected to a first lubricant supply (100) for supplying said first outlet open element (321) and said second outlet open element (322) of the first lubricating means (32) with the fluid lubricant; and a second lubricating means (42) adapted for ensuring a dry lubrication of at least a portion of the second guiding element (40) by supplying the fluid lubricant along the second guiding face element (41), whereby the second lubricating means (42) has at least (a) a first outlet open element (421) along the the second guiding face element (41) with an open outer surface of less than 100 mm$^2$, (b) a second outlet open element (422) along the second guiding face element (41) with an open surface of less than 100 mm$^2$, said second outlet open element (422) of the second lubricating means (42) being distant from the first outlet open element (421) of the second lubricating means (42) by a at least partly curved path distance of at least 10 cm, and (c) a supply connecting system (466) connecting the first outlet open element (421) and the second outlet open element (422) of the second lubricating means (42) to a connector (427) adapted to be connected to a lubricant supply (100,110) selected from the group consisting of the first lubricant supply and a second lubricant supply distinct from the first lubricant supply for supplying said first outlet open element (421) and said second outlet open element (422) of the second lubricating means (42) with the fluid lubricant.

2. The device of claim 1, in which at least one of the first outlet open element (321) and the second outlet open element (322) of the first lubricating means (32) and at least one of the first outlet open element (421) and the second outlet open element (422) of the second lubricating means (42) have an outer form selected from the group consisting of a substantially circular outer form with an outer diameter comprised between 0.5 mm and 5 mm, a substantially ellipse outer form with an equivalent diameter comprised between 0.5 mm and 5 mm, an elongated outer form with an average width comprised between 0.5 mm and 5 mm and an average length greater than the average width, but comprised between 3 mm and 50 mm, and combinations of parts thereof.

3. The device of claim 1, in which at least one of the first outlet open element (321) and the second outlet open element (322) of the first lubricating means (32) and at least one of the first outlet open element (421) and the second outlet open element (422) of the second lubricating means (42) have the form of a groove (G) with an average width comprised between 0.5 mm and 5 mm and an average length (L) greater than the average width and comprised between 3 mm and 50 mm.

4. The device of claim 1, in which the first guiding element (30) comprises at least two first guiding face elements distant from each other and selected from the group consisting of at least partly curved rods and at least partly curved elongated elements (301,302), each of said at least two first guiding face elements (301,302) of the first guiding element (30) when defolded in a substantially straight shape having a substantially curved contact face defining a linear contact face adapted to contact substantially continuously a portion of an outer facing system (20) of the container (2) when moving in the device, said linear contact face having a a width of less than 0.5 mm, while the second guiding element (40) comprises at least two second guiding face elements distant from each other and selected from the group consisting of at least partly curved rods and at least partly curved elongated elements (401,402), each of said at least two second guiding face elements (401,402) of the second guiding element (40) when defolded in a substantially straight shape having a substantially curved contact face defining a linear contact face adapted to contact substantially continuously a portion of an outer facing system (20) of the container (2) when moving in the device, said linear contact face having a a width of less than 0.5 mm.

5. The device of claim 4, in which the curved rods or the curved elongated elements (301,302; 401,402) of the first guiding face element (31) and/or of the second guiding face element (41) are each provided with at least a first passage or channel ending into a first outlet open element (321,421) and a second passage or channel ending into a second outlet open element (322,422) of the first lubricating means (32) or the second lubricating means (42), whereby with respect to the said curved rods or curved elongated elements (301,302; 401,402) when defolded in straight shape, the said first outlet open element (321,421) and the said second outlet open element (322, 422) of each curved rod or curved elongated element (301,302;401,402) extend along a substantially linear curved contact face of the curved rod or curved elongated element (301,302;401,402) taken into consideration with a width of less than 0.5 mm, said first outlet open element (321,421) and said second outlet open element (322, 422) being distant by a distance of at least 10 cm.

6. The device of claim 1, further comprising:

a third guiding element (50) attached to said support (10), said third guiding element (50) having at least a third guiding face element (51) adapted for contacting at least a portion of the bottom face (201) of the containers (2) moving in the at least partly curved path portion (3A); and a third lubricating means (52) adapted for ensuring a dry lubrication of at least a portion of the third guiding element (50) by supplying the fluid supplying the fluid lubricant along the third guiding face element (51), whereby the third lubricating means (52) has at least (a) a first outlet open element (521) along the third guiding face element (51) with an open outer surface of less than 100 mm², (b) a second outlet open element (522) along the third guiding face element (51) with an open surface of less than 100 mm², said second outlet open element (522) being distant from the first outlet open element (521) by an at least partly curved path distance of at least 10 cm, and (c) a supply connecting system (566) connecting the first outlet open element (521) and the second outlet open element (522) to a connector (527) adapted to be connected to a lubricant supply (100, 110, 120) selected from the group consisting of the first lubricant supply, the second lubricant supply and a third lubricant supply distinct from the first lubricant supply and distinct from the second lubricant supply for supplying said first outlet open element (521) and said second outlet open element (522) of the third lubricating means (52) with the fluid lubricant.

7. The device of claim 1, further comprising:
a third guiding element (50) attached to said support (10), said third guiding element (50) having at least a third guiding face element (51) adapted for contacting at least a portion of the bottom face (201) of the containers (2) moving in the at least partly curved path portion (3A);
a third lubricating means (52) adapted for ensuring a dry lubrication of at least a portion of the third guiding element (50) by supplying the fluid supplying the fluid lubricant along the third guiding face element (51), whereby the third lubricating means (52) has at least (a) a first outlet open element (521) along the third guiding face element (51) with an open outer surface of less than 100 mm², (b) a second outlet open element (522) along the third guiding face element (51) with an open surface of less than 100 mm², said second outlet open element (522) being distant from the first outlet open element (521) by an at least partly curved path distance of at least 10 cm, and (c) a supply connecting system (566) connecting the first outlet open element (521) and the second outlet open element (522) to a connector (527) adapted to be connected to a lubricant supply (100, 110, 120) selected from the group consisting of the first lubricant supply, the second lubricant supply and a third lubricant supply distinct from the first lubricant supply and distinct from the second lubricant supply for supplying said first outlet open element (521) and said second outlet open element (522) of the third lubricating means (52) with the fluid lubricant
a fourth guiding element (60) attached to said support (10), said fourth guiding element (60) having at least a fourth guiding face element (61) adapted for contacting at least a second portion of the top face (202) of the containers (2) moving in the at least partly curved path portion (3A); and
a fourth lubricating means (62) adapted for ensuring a dry lubrication of at least a portion of the fourth guiding element (60) by supplying the fluid lubricant along the fourth guiding face element (61), whereby the fourth lubricating means (62) has (a) a first outlet open element (621) along the the fourth guiding face with an open outer surface of less than 100 mm², (b) a second outlet open element (622) along the fourth guiding face element (61) with an open surface of less than 100 mm², said second outlet open element (622) being distant from the first outlet open element (621) by a curved path distance of at least 10 cm, and (c) a supply connecting system (666) connecting the first outlet open element (621) and the second outlet open element (622) to a connector (627) adapted to be connected to a lubricant supply (100,110,120,130) selected from the group consisting of the first lubricant supply, the second lubricant supply, the third lubricant supply and a fourth lubricant supply distinct from the first, second and third lubricant supplies for supplying said first outlet open element (621) and said second outlet open element (622) of the fourth lubricating means (62) with the fluid lubricant.

8. The device of claim 7, in which at least one of the first outlet open element (321) and the second outlet open element (322) of the first lubricating means (32), at least one of the first outlet open element (421) and the second outlet open element (422) of the second lubricating means (42), at least one of the first outlet open element (521) and the second outlet open element (522) of the third lubricating means (52), and at least one of the first outlet open element (621) and the second outlet open element (622) of the fourth lubricating means (62) have the form of a groove (G) with an average width comprised between 0.5 mm and 5 mm and an average length (L) greater than the average width and comprised between 3 mm and 50 mm.

9. The device of claim 7, in which the first guiding face element (31) of the first guiding element (30) defines an at least partly curved surface (303) contacting substantially continuously a portion of the lateral facing system (203) selected from the group consisting of a linear zone with a width of less than 0.5 cm and a surface zone of less than 5 mm² of the lateral facing system (203),
in which the second guiding face element (41) of the second guiding element (40) defines a curved surface contacting substantially continuously a portion of the lateral facing system (203) selected from the group consisting of a linear zone with a width of less than 0.5 cm and a surface zone of less than 5 mm² of the lateral facing system (203),
in which the third guiding face element (51) of the third guiding element (50) defines a curved surface contacting substantially continuously at least one portion of the bottom face (201) of the container (2) selected from the group consisting of a linear zone with a width of less than 0.5 cm and a surface zone of less than 5 mm² of the bottom face (201), and
in which the fourth guiding face element (61) of the fourth guiding element (60) defines a curved surface contacting substantially continuously at least one portion of the top face (202) of the container (2) selected from the group consisting of a linear zone with a width of less than 0.5 cm and a surface zone of less than 5 mm² of the top face (202).

10. The device of claim 1, in which the first lubricating means (32) is adapted for ensuring a dry lubrication of at least a portion of the first guiding element (30) by supplying the fluid lubricant along the first guiding face element (31), whereby the first lubricating means (32) has at least (a) a first outlet open element (321) along the the first guiding face element (31) with an open outer surface of less than 100 mm², (b) a second outlet open element (322) along the first guiding face element (31) with an open surface of less than 100 mm², said second outlet open element being distant from the first outlet open element by an at least partly curved path distance of at least 50 cm, (c) a third outlet open element (323) along the first guiding face element (31) with an open surface of less than 100 mm², said third outlet open element being distant from the first outlet open element (321) by an at least partly curved path distance of at least 100 cm and from the second outlet open element (322) by a distance of at least 50 cm, and (d) a supply connecting system (366) connecting the first outlet open element (321), the second outlet open element (322) and the third outlet open element (323) to at least a connector (327) adapted to be connected to a first lubricant supply (100) for supplying said first outlet open element (321), said second outlet open element (322) and said third outlet open element (323) of the first lubricating means (32) with the fluid lubricant; and
in which the second lubricating means (42) is adapted for ensuring a dry lubrication of at least a portion of the second guiding element (40) by supplying the fluid lubricant along the second guiding face element (41), whereby the second lubricating means (42) has at least (a) a first outlet open element (421) along the the first guiding face element (41) with an open outer surface of less than 100 mm², (b) a second outlet open element (422) along the first guiding face element (41) with an open surface of less than 100 mm², said second outlet open element (422) being distant from the first outlet open element by an at least partly curved path distance of at least 50 cm, (c) a third outlet open element (423) along the second guiding face element (41) with an open surface of less than 100 mm², said third outlet open element (423) being distant from the first outlet open element (421) by an at least partly curved path distance of at least 100 cm and from the second outlet open element (422) by a distance of at least 50 cm, and (d) a supply connecting system (466) connecting the first outlet open element (421), the second outlet open element (422) and the third outlet open element (423) to at least a connector (427) adapted to be connected to a lubricant supply (100,110) selected from the group consisting of the first lubricant supply and a second lubricant supply distinct from the first lubricant supply for supplying said first outlet open element (421), said second outlet open element (422) and said third outlet open element (423) of the second lubricating means with the fluid lubricant.

11. The device of claim 1, which further comprises a centralised supply system (1000,100,110,120,130,140) adapted for controlling at least the supply of lubricant under pressure at least to the first lubricating means (32) and to the second lubricating means (42).

12. The device of claim 1, which comprises a guiding box (200) provided with at least the first guiding element (30) and the second guiding element (40).

13. The device of claim 1, in which the moving path (3) comprising the at least partly curved path portion (3A) with an at partly curved length path comprised between 30 cm and 500 cm comprises at least a first substantially linear path portion (3B) and a second substantially linear path portion (3C) distant from the first substantially linear path portion (3B), whereby a curved path portion (3D) is located between the said first substantially linear path portion (3B) and the said second substantially linear path portion (3C), and whereby the first outlet open element (321) of the first lubricating means (32) and the first outlet open element (421) of the second lubricating means (42) are located in the first substantially linear path portion (3B) for ensuring a dry lubrication of respectively at least a substantially linear portion of the first guiding element (30) and at least a substantially linear portion of the second guiding element (40).

14. The device of claim 13, in which the second outlet open element (322) of the first lubricating means (32) and the second outlet open element (422) of the second lubricating means (42) are located in the second substantially linear path portion (3C) for ensuring a dry lubrication of respectively at least a substantially linear portion of the first guiding element (30) and a substantially linear portion of the second guiding element (40).

15. The device of claim 1, in which at least one guiding element selected from the group consisting of the first guiding element (30) and the second guiding element (40), after development as an linear element has substantially the shape of a linear elongated element selected from the group consisting of a rod provided with a series of lateral openings placed along a helix and a tube provided with a series of lateral openings placed along a helix.

16. The device of claim 1, in which at least the guiding elements selected from the group consisting of the first guiding element (30) and the second guiding element (40) have each substantially the shape of a rod or tube provided with at least two substantially linear portions separated by a curved path portion.

17. The device of claim 7, in which the first guiding element (30), the second guiding element (40), the third guiding element (50), and the fourth guiding element (60) have each substantially the shape of a rod or tube provided with at least two substantially linear portions separated by a curved path portion.

18. The device of claim 1, which further comprises at least:
a third guiding element (50) attached to said support (10), said third guiding element (50) having at least a third guiding face element (51) adapted for contacting at least a portion of the bottom face (201) of the containers (2) moving in the at least partly curved path portion (3A); and
a fourth guiding element (60) attached to said support (10), said fourth guiding element (60) having at least a fourth guiding face element (61) adapted for contacting at least a second portion of the top face (202) of the containers (2) moving in the at least partly curved path portion (3A);
whereby at least one guiding element selected from the group consisting of the first guiding element (30), the second guiding element (40), the third guiding element (50), and the fourth guiding element (60) is shaped so as to define at each moment of the twisting of a container, a linear contact zone between the outer surface of the container and the at least one guiding element with a length of less than 0.5 cm and a surface contact zone between the outer surface of the container and the at least one guiding element of less than 5 mm² with a face of the container moving along the one considered guiding element.

19. The device of claim 18,
in which, at least one guiding element selected from the group consisting of the first guiding element (30), the second guiding element (40), the third guiding element (50), and the fourth guiding element (60) comprises at least two elongated distinct element portions or parts, which are each shaped so as to define at each moment of the twisting of a container, a linear contact zone between the outer surface of the container and an elongated distinct guiding element of said at least one guiding element with a length of less than 0.5 cm and a surface contact zone between the outer surface of the container and an elongated distinct guiding element of said at least one guiding element of less than 5 mm².

20. The device of claim 1, in which at least one guiding element selected from the group consisting of the first guiding element (30) and the second guiding element (40) is provided with a cooling system, said cooling system being advantageously in the form of a tube or channel adapted to be connected to a coolant supply means (200).

21. The device of claim 1, in which at least one guiding element selected from the group consisting of the first guiding element (30) and the second guiding element (40) is associated to a temperature sensor (201), and to a control system receiving at least one signal from the temperature sensor for controlling a process step selected from the group consisting of a lubrication step, a cooling step of the at least one guiding element and a container speed along the twisting path.

22. The device of claim 1 for moving containers following a central moving direction parallel to a central twisting axis, in which at least a gazeous lubricant under pressure is used as the fluid lubricant for at least a portion of a guiding face tube element selected from the group consisting of the first guiding face element and the second guiding face element, in which the said portion of the guiding face tube element is provided with a series of injector openings distant the one from the other by a distance of less than 5 cm, said injector openings being adapted for expelling the gazeous lubricant along a central direction having at least a direction composant parallel to the central moving direction, at least some injector openings being adapted for directing a flow of gazeous lubricant in order to ease the twisting of containers.

23. An conveyor for moving containers (2) along a moving path, said conveyor comprising at least a moving band (C1) directing containers towards a twisting device (1) for twisting containers (2) while moving said containers along a moving path (3) in the twisting device, said moving path (3) comprising an at least partly curved path portion (3A) with an at least partly curved length path comprised between 30 cm and 500 cm for ensuring that each container (2) moving through the said at least partly curved path portion (3A) follows at least a curved movement, said containers (2) having at least an outer facing system (20), said at least partly curved path portion (3A) extending between an inlet (4) for the containers into the at least partly curved path portion (3A) and an outlet (5) for containers (2) after moving through the at least partly curved path portion (3A), whereby between said inlet (4) and outlet (5), the at least partly curved path portion (3A) comprises at least:

a support (10);

a first guiding element (30) attached to said support (10), said first guiding element (30) having at least a first guiding face element (31) adapted for contacting at least a first portion of an outer facing system (20) of the containers (2) moving in the at least partly curved path portion (3A);

a second guiding element (40) attached to said support (10), said second guiding element (40) having at least a second guiding face element (41) distant from the first guiding face element (31) and adapted for contacting at least a second portion of the outer facing system (20) of the containers (2) moving in the at least partly curved path portion (3A), said second portion of the outer facing system (20) of the containers being distinct from the first portion of the outer facing system (20) of the containers (2);

a first lubricating means (32) adapted for ensuring a dry lubrication of at least a portion of the first guiding element (30) by supplying a fluid lubricant selected from the group consisting of liquid lubricant, gazeous lubricant and mixtures thereof, along the first guiding face element (31), whereby the first lubricating means (32) has at least (a) a first outlet open element (321) along the the first guiding face element (31) with an outer open surface of less than 100 mm², (b) a second outlet open element (322) along the first guiding face element (31) with an outer open surface of less than 100 mm², said second outlet open element (322) being distant from the first outlet open element (321) by an at least partly curved path distance of at least 10 cm, and (c) a supply connecting system (366) connecting the first outlet open element (321) and the second outlet open element (322) to a connector (327) adapted to be connected to a first lubricant supply (100) for supplying said first outlet open element (321) and said second outlet open element (322) of the first lubricating means (32) with the fluid lubricant; and a second lubricating means (42) adapted for ensuring a dry lubrication of at least a portion of the second guiding element (40) by supplying the fluid lubricant along the second guiding face element (41), whereby the second lubricating means (42) has at least (a) a first outlet open element (421) along the the second guiding face element (41) with an open outer surface of less than 100 mm², (b) a second outlet open element (422) along the second guiding face element (41) with an open surface of less than 100 mm², said second outlet open element (422) of the second lubricating means (42) being distant from the first outlet open element (421) of the second lubricating means (42) by a at least partly curved path distance of at least 10 cm, and (c) a supply connecting system (466) connecting the first outlet open element (421) and the second outlet open element (422) of the second lubricating means (42) to a connector (427) adapted to be connected to a lubricant supply (100,110) selected from the group consisting of the first lubricant supply and a second lubricant supply distinct from the first lubricant supply for supplying said first outlet open element (421) and said second outlet open element (422) of the second lubricating means (42) with the fluid lubricant.

24. The conveyor of claim 23, in which at least one of the first outlet open element (321) and the second outlet open element (322) of the first lubricating means (32) and at least one of the first outlet open element (421) and the second outlet open element (422) of the second lubricating means (42) have the form of a groove (G) with an average width comprised between 0.5 mm and 5 mm and an average length (L) greater than the average width and comprised between 3 mm and 50 mm.

25. The conveyor of claim 23, in which the first guiding element (30) comprises at least two first guiding face elements distant from each other and selected from the group consisting of at least partly curved rods and at least partly curved elongated elements (301,302), each of said at least two first guiding face elements (301,302) of the first guiding element (30) when defolded in a substantially straight shape having a substantially curved contact face defining a linear contact face adapted to contact substantially continuously a portion of an outer facing system (20) of the container (2) when moving in the device, said linear contact face having a a width of less than 0.5 mm, while the second guiding element (40) comprises at least two second guiding face elements distant from each other and selected from the group consisting of at least partly curved rods and at least partly curved elongated elements (401,402), each of said at least two second guiding face elements (401,402) of the second guiding element (40) when defolded in a substantially straight shape having a substantially curved contact face defining a linear contact face adapted to contact substantially continuously a portion of an outer facing system (20) of the container (2) when moving in the device, said linear contact face having a a width of less than 0.5 mm.

26. The conveyor of claim 23, in which the twisting device further comprises:
    a third guiding element (50) attached to said support (10), said third guiding element (50) having at least a third guiding face element (51) adapted for contacting at least a portion of the bottom face (201) of the containers (2) moving in the at least partly curved path portion (3A);
    a third lubricating means (52) adapted for ensuring a dry lubrication of at least a portion of the third guiding element (50) by supplying the fluid supplying the fluid lubricant along the third guiding face element (51), whereby the third lubricating means (52) has at least (a) a first outlet open element (521) along the third guiding face element (51) with an open outer surface of less than 100 mm², (b) a second outlet open element (522) along the third guiding face element (51) with an open surface of less than 100 mm², said second outlet open element (522) being distant from the first outlet open element (521) by an at least partly curved path distance of at least 10 cm, and (c) a supply connecting system (566) connecting the first outlet open element (521) and the second outlet open element (522) to a connector (527) adapted to be connected to a lubricant supply (100, 110, 120) selected from the group consisting of the first lubricant supply, the second lubricant supply and a third lubricant supply distinct from the first lubricant supply and distinct from the second lubricant supply for supplying said first outlet open element (521) and said second outlet open element (522) of the third lubricating means (52) with the fluid lubricant
    a fourth guiding element (60) attached to said support (10), said fourth guiding element (60) having at least a fourth guiding face element (61) adapted for contacting at least a second portion of the top face (202) of the containers (2) moving in the at least partly curved path portion (3A); and
    a fourth lubricating means (62) adapted for ensuring a dry lubrication of at least a portion of the fourth guiding element (60) by supplying the fluid lubricant along the fourth guiding face element (61), whereby the fourth lubricating means (62) has (a) a first outlet open element (621) along the the fourth guiding face with an open outer surface of less than 100 mm², (b) a second outlet open element (622) along the fourth guiding face element (61) with an open surface of less than 100 mm², said second outlet open element (622) being distant from the first outlet open element (621) by a curved path distance of at least 10 cm, and (c) a supply connecting system (666) connecting the first outlet open element (621) and the second outlet open element (622) to a connector (627) adapted to be connected to a lubricant supply (100,110,120,130) selected from the group consisting of the first lubricant supply, the second lubricant supply, the third lubricant supply and a fourth lubricant supply distinct from the first, second and third lubricant supplies for supplying said first outlet open element (621) and said second outlet open element (622) of the fourth lubricating means (62) with the fluid lubricant.

27. The conveyor of claim 26, in which at least one of the first outlet open element (321) and the second outlet open element (322) of the first lubricating means (32), at least one of the first outlet open element (421) and the second outlet open element (422) of the second lubricating means (42), at least one of the first outlet open element (521) and the second outlet open element (522) of the third lubricating means (52), and at least one of the first outlet open element (621) and the second outlet open element (622) of the fourth lubricating means (62) have the form of a groove (G) with an average width comprised between 0.5 mm and 5 mm and an average length (L) greater than the average width and comprised between 3 mm and 50 mm.

28. The conveyor of claim 23, which further comprises a centralised supply system (1000,100,110,120,130,140) adapted for controlling at least the supply of lubricant under pressure at least to the first lubricating means (32) and to the second lubricating means (42).

29. The conveyor of claim 23, in which the moving path (3) of the twisting device comprising the at least partly curved path portion (3A) with an at partly curved length path comprised between 30 cm and 500 cm comprises at least a first substantially linear path portion (3B) and a second substantially linear path portion (3C) distant from the first substantially linear path portion (3B), whereby a curved path portion (3D) is located between the said first substantially linear path portion (3B) and the said second substantially linear path portion (3C), and whereby the first outlet open element (321) of the first lubricating means (32) and the first outlet open element (421) of the second lubricating means (42) are located in the first substantially linear path portion (3B) for ensuring a dry lubrication of respectively at least a substantially linear portion of the first guiding element (30) and at least a substantially linear portion of the second guiding element (40).

30. The conveyor of claim 29, in which the second outlet open element (322) of the first lubricating means (32) and the second outlet open element (422) of the second lubricating means (42) are located in the second substantially linear path portion (3C) for ensuring a dry lubrication of respectively at least a substantially linear portion of the first guiding element (30) and a substantially linear portion of the second guiding element (40).

31. The conveyor of claim 23, in which at least one guiding element selected from the group consisting of the first guiding element (30) and the second guiding element (40), after development as an linear element has substantially the shape of a linear elongated element selected from the group consisting of a rod provided with a series of lateral openings placed along a helix and a tube provided with a series of lateral openings placed along a helix.

32. The conveyor of claim 23, further comprising a cooling system adapted for cooling at least one guiding element selected from the group consisting of the first guiding element (30) and the second guiding element (40).

33. The conveyor of claim 23, which further comprises (a) a temperature senor (201) adapted for determining a temperature parameter of at least one guiding element selected from the group consisting of the first guiding element (30) and the second guiding element (40), and (b) a control system receiving at least the temperature parameter from the temperature sensor (201) for controlling at least a process step of the twisting device selected from the group consisting of a lubrication step, a cooling step of the at least one guiding element and a container speed of the moving band directing containers towards the twisting device.

34. The conveyor of claim 23, whereby for moving containers in the twisting device following a central moving direction parallel to a central twisting axis, at least a gazeous lubricant under pressure is used as the fluid lubricant for at least a portion of a guiding face tube element selected from the group consisting of the first guiding face element and the second guiding face element, in which the said portion of the guiding face tube element is provided with a series of injector openings distant the one from the other by a distance of less than 5 cm, said injector openings being adapted for expelling the gazeous lubricant along a central direction having at least a direction composant parallel to the central moving direction, at least some injector openings being adapted for directing a flow of gazeous lubricant in order to ease the twisting of containers in the twisting device.

35. A method for twisting containers (2) in a twisting device (1) while moving said containers along a moving path (3) of the twisting device, said twisting device (1) comprising an at least partly curved path portion (3A) with an at least partly curved length path comprised between 30 cm and 500 cm for ensuring that each container (2) moving through the said at least partly curved path portion (3A) follows at least a curved movement, said containers (2) having at least an outer facing system (20), said at least partly curved path portion (3A) extending between an inlet (4) for the containers into the at least partly curved path portion (3A) and an outlet (5) for containers (2) after moving through the at least partly curved path portion (3A), whereby between said inlet (4) and outlet (5), the at least partly curved path portion (3A) comprises at least:
  a support (10);
  a first guiding element (30) attached to said support (10), said first guiding element (30) having at least a first guiding face element (31) adapted for contacting at least a first portion of an outer facing system (20) of the containers (2) moving in the at least partly curved path portion (3A);
  a second guiding element (40) attached to said support (10), said second guiding element (40) having at least a second guiding face element (41) distant from the first guiding face element (31) and adapted for contacting at least a second portion of the outer facing system (20) of the containers (2) moving in the at least partly curved path portion (3A), said second portion of the outer facing system (20) of the containers being distinct from the first portion of the outer facing system (20) of the containers (2);
  a first lubricating means (32) adapted for ensuring a dry lubrication of at least a portion of the first guiding element (30) by supplying a fluid lubricant selected from the group consisting of liquid lubricant, gazeous lubricant and mixtures thereof, along the first guiding face element (31), whereby the first lubricating means (32) has at least (a) a first outlet open element (321) along the the first guiding face element (31) with an outer open surface of less than 100 mm$^2$, (b) a second outlet open element (322) along the first guiding face element (31) with an outer open surface of less than 100 mm$^2$, said second outlet open element (322) being distant from the first outlet open element (321) by an at least partly curved path distance of at least 10 cm, and (c) a supply connecting system (366) connecting the first outlet open element (321) and the second outlet open element (322) to a connector (327) adapted to be connected to a first lubricant supply (100) for supplying said first outlet open element (321) and said second outlet open element (322) of the first lubricating means (32) with the fluid lubricant; and
  a second lubricating means (42) adapted for ensuring a dry lubrication of at least a portion of the second guiding element (40) by supplying the fluid lubricant along the second guiding face element (41), whereby the second lubricating means (42) has at least (a) a first outlet open element (421) along the the second guiding face element (41) with an open outer surface of less than 100 mm$^2$, (b) a second outlet open element (422) along the second guiding face element (41) with an open surface of less than 100 mm$^2$, said second outlet open element (422) of the second lubricating means (42) being distant from the first outlet open element (421) of the second lubricating means (42) by a at least partly curved path distance of at least 10 cm, and (c) a supply connecting system (466) connecting the first outlet open element (421) and the second outlet open element (422) of the second lubricating means (42) to a connector (427) adapted to be connected to a lubricant supply (100,110) selected from the group consisting of the first lubricant supply and a second lubricant supply distinct from the first lubricant supply for supplying said first outlet open element (421) and said second outlet open element (422) of the second lubricating means (42) with the fluid lubricant,
  said method comprising at least the following steps:
    determining a parameter associated to the twisting of containers in in the twisting device (1),
    determining whether said determined parameter is not within an acceptable range or is outside an acceptable range, so as to determine a required lubrication step of at least a portion of the first guiding means and of a portion of the second guiding means, and
    controlling the supply of fluid lubricant to the first lubricating means and to the second lubricating means when a required lubrication step is determined.

36. The method of claim 35, further comprising the step of determining a parameter function of the temperature of at least one guiding element (30,40,50,60) of the twisting device (1) for determining at least the requirement of a cooling step when the determined parameter is not within an acceptable range or is outside an acceptable range, and the step of cooling at least a portion of the twisting device when the requirement of a cooling step is determined.

* * * * *